(12) United States Patent
Donescu et al.

(10) Patent No.: US 6,718,045 B2
(45) Date of Patent: Apr. 6, 2004

(54) METHOD AND DEVICE FOR INSERTING A WATERMARKING SIGNAL IN AN IMAGE

(75) Inventors: Ioana Donescu, Rennes (FR); Eric Nguyen, Rennes (FR)

(73) Assignee: Canon Kabushiki Kaisha, Tokyo (JP)

( * ) Notice: Subject to any disclaimer, the term of this patent is extended or adjusted under 35 U.S.C. 154(b) by 643 days.

(21) Appl. No.: 09/756,136

(22) Filed: Jan. 9, 2001

(65) Prior Publication Data

US 2001/0031064 A1 Oct. 18, 2001

(30) Foreign Application Priority Data

Jan. 11, 2000 (FR) .............................. 00 00287

(51) Int. Cl.$^7$ .................................. G06K 9/00
(52) U.S. Cl. ......................... 382/100; 380/51; 380/54; 713/176
(58) Field of Search ............................... 382/100, 232, 382/240; 380/51, 54, 201, 210, 252, 287; 370/522, 523, 524, 525, 526, 527, 528, 529; 283/72, 73, 74, 75, 76, 77, 78, 79, 80, 81, 85, 93, 113, 901, 902

(56) References Cited

U.S. PATENT DOCUMENTS

| 5,629,780 | A | | 5/1997 | Watson ........................ 358/432 |
| 5,946,414 | A | * | 8/1999 | Cass et al. ................... 382/183 |
| 6,061,793 | A | * | 5/2000 | Tewfik et al. ............... 713/176 |
| 6,122,403 | A | * | 9/2000 | Rhoads ........................ 382/233 |
| 6,208,735 | B1 | * | 3/2001 | Cox et al. ..................... 380/54 |
| 6,385,329 | B1 | * | 5/2002 | Sharma et al. .............. 382/100 |

FOREIGN PATENT DOCUMENTS

| EP | 891071 | 1/1999 |
| EP | 933919 | 8/1999 |
| EP | 967783 | 12/1999 |

OTHER PUBLICATIONS

A.B. Watson, editor, "Digital Images and Human Vision", Cambridge MA: MIT Press, 1993, entire book.
T. Kohonen, editor, "Self–Organization And Associative Memory", Springer–Verlag, 1988.
M. Barni, F. Bartolini, W. Cappellini, A. Lippi, and A. Piva, "A DWT–based technique for spatio–frequency masking of digital signatures", In Proc. SPIE, pp. 31–39, Jan. 1999.
C.H. Chou and Y.C. Li, "A Perceptually Tuned Subband Image Coder Based on the Measure of Just Noticeable Distortion Profile", IEEE Trans. on Circsuits and Systems for Video Technology, 5(6):467–476, 1995.
S.A. Karunasekera and N.D. Kingsbury, "A Distortion Measure for Blocking Artifacts in Images Based on Human Visual System", In Proc. SPIE, Human Vision, Visual Processing and Digital Display, vol. 2094, 1994.

(List continued on next page.)

Primary Examiner—Jayanti K. Patel
Assistant Examiner—Abolfazl Tabatabai
(74) Attorney, Agent, or Firm—Fitzpatrick, Cella, Harper & Scinto

(57) ABSTRACT

A method of inserting a watermarking signal (w) in a set (X) of coefficients ($X_i$) representing a digital image (I), in which at least one subset of coefficients is modified by said watermarking signal (w), comprises, for each representative coefficient ($X_i$) to be modified, a step of determining a neighborhood ($V(X_i)$) of the representative coefficient ($X_i$) to be modified, in the image (I); a step of selecting a neighborhood ($V_{sim}^d$) in a dictionary of neighborhoods representing coefficients representing the image (I), according to a predetermined criterion of similarity with the neighborhood ($V(X_i)$) of the representative coefficient ($X_i$) under consideration; and a step of modifying the representative coefficient ($X_i$) as a function of the watermarking signal (w) and a predetermined masking data item ($M(V_{sim}^d)$) representing the masking effect on a watermarking signal, of the neighborhood ($V_{sim}^d$) selected in the dictionary.

27 Claims, 10 Drawing Sheets

OTHER PUBLICATIONS

A.S. Lewis and G. Knowles, "Image Compression Using the 2D Wavelet Transform", IEEE Trans. on Image Processing, 1(2), 1992.

Y. Linde, A. Buzo, and R. Gray, "An Algorithm for Vector Quantizer Design", IEEE Trans. on Communications, pp. 84–95, Jan. 1980.

N.M. Nasrabadi and Y. Feng, "Vector Quantization of Images Based Upon the Kohonen Self–Organizing Feature Map", In Proc. of IEEE Int. Conf. on Neural Networks, pp. 101–107, 1988.

C. Podilchuk and W. Zeng, "Image–Adaptive Watermarking Using Visual Models", IEEE Journal on Selected Areas in Communications, 16(4):525–539, 1998.

Ph. Salembier, "Morphological multiscale segmentation for image coding", Signal Processing (Elsevier), 38:359–386, 1994.

M.D. Swanson, M. Kobayashi, and A. Tewfik, "Multimedia Data Embedding and Watermarking Technologies", IEEE Proceedings, 86(6):1064–1087, 1998.

M.D. Swanson, B. Zhu, and A. Tewfik, "Transparent Robust Image Watermarking", In Proc. ICIP, pp. 211–214, Lausanne, Suisse, Sep. 1996.

A.B. Watson, "DCT quantization matrices visually optimized for individual images", In Proc. SPIE, Human Vision, Visual Processing and Digital Display IV, 1993.

A.B. Watson, "Visibility of Wavelet Quantization Noise", IEEE Trans. on Image Processing, 6(8), 1997.

B. Zhu, M.D. Swanson, and A. Tewfik, "Transparent Robust Authentication and Distortion Measurement Technique for Images", In Proc. IEEE Signal Processing Society Workshop on Multimedia Signal Processing, Los Angeles, USA, Dec. 1998.

A.E. Jacquin, "Image Coding Based on a Fractal Theory of Iterated Contractive Image Transformations", IEEE Transactions On Image Processing, vol. 1, No. 1, Jan. 1992.

I. Pitas, A Method For Signature Casting On Digital Images, in Proc. ICIP, pp. 215–218, Sep. 1996.

Inoue, H. et al., "A digital Watermark Based On The Wavelet Transform And Its Robustness On Image Compression", International Conference On Image Processing, U.S., Los Alamitos, CA: IEEE Computer Soc., vol. Conf. 5, Oct. 1998, PP. 391–395.

Antonini, M., "Image Coding Using Wavelet Transform", IEEE Transaction On Image Processing, U.S., IEEE Inc., New York, vol. 1, No. 2, Apr. 1, 1992, PP. 205–220.

Kundur, D. et al., "A Robust Digital Image Watermarking Method Using Wavelet–Based Fusion", Proceedings Of The International Conference On Image Processing, U.S. Los Alamitos, CA: IEEE, Oct., 1997.

* cited by examiner

METHOD AND DEVICE FOR INSERTING A WATERMARKING SIGNAL IN AN IMAGE

TECHNICAL FIELD

The present invention lies in general terms within the technical field of watermarking of digital images, more particularly fixed images.

The present invention concerns in particular a method of inserting a watermarking signal in a set of coefficients representing a digital image, in which at least one subset of coefficients is modified by said watermarking signal.

The invention also concerns a device able to implement such a method.

BACKGROUND OF THE INVENTION

Watermarking digital data makes it possible to protect these data, for example by associating copyright information with them.

In its general principle, watermarking consists of inserting an indelible mark in digital data, similar to the encoding of additional information in the data.

The decoding of this additional information makes it possible to check the copyright information inserted.

This inserted watermark must consequently be imperceptible, robust to certain distortions applied to the digital image and capable of reliable detection.

Conventionally, the insertion of a watermarking signal in an image is obtained by modifying coefficients representing the image to be watermarked.

For example, a usual technique of inserting a watermarking signal in a digital image consists of using a linear modulation model in which at least one subset of spectral coefficients representing the digital image is modulated according to this linear model using a weighting coefficient.

Denoting $X=\{X_i, 1 \leq i \leq N\}$ a set of coefficients representing a digital image and $w=\{w_j, 1 \leq j \leq P\}$ a watermarking signal of size P less than N, the linear insertion formula is:

$$X^*_j = X_{j(i)} + \alpha_j w_j$$

in which $X_{j(i)}$ designates a spectral coefficient amongst a subset chosen from the set X of spectral coefficients, and $\alpha_j$ is a weighting coefficient, also referred to as the modulation amplitude.

The detection of the watermarking signal then consists of detecting whether or not a modulation sequence has been inserted in a set of coefficients. This detection is carried out without using the original watermarked image and is based on a correlation calculation or on a standardised statistical test which makes it possible to theoretically calculate a probability of correct detection.

Such an insertion technique makes it possible, through the insertion of a watermarking signal, to insert a single information bit since the response of the detector is binary.

To insert a larger number of information bits in the digital image, in particular when a code of C bits indicating for example the name or address of the owner or author of the image is required, it is necessary to reiterate the insertion method described previously as many times as there are bits of information to be inserted.

Each weighting coefficient $\alpha_j$ must be greater than a minimum value, which can be termed the detection amplitude, so as to permit detection of the inserted signal with a correct level of probability.

This minimum value or detection amplitude depends notably on the length of the watermarking signal and on the level of detection probability required.

Moreover, each coefficient $\alpha_j$ must be less than a maximum value which can be termed the visual amplitude, denoted generally JND (Just Noticeable Difference) so as to meet the imperceptibility criterion of the watermarking signal.

It is known from the state of the art that the local content of the image to be watermarked has a visual masking effect which results in a drop in visual sensitivity making it possible to locally increase the modulation amplitude in the addition of the watermarking signal. Typically, luminance masking and contrast masking are spoken of.

It is then a case of applying psychovisual models in the domain of the image processing, and in particular in the compression of images.

The use of the results of psychovisual studies for adjusting the watermarking weighting in the domain of the watermarking of digital images is known from the state of the art.

For example, in the article entitled "A DWT—based technique for spatio-frequency masking of digital signatures" by M. Barni, F. Bartolini, V. Cappellini, A. Lippi and A. Piva, which appeared in Proc. SPIE, pages 31–39, January 1999, a method of inserting a watermarking signal in the domain of the digital wavelet transformation (DWT) of a digital image is described.

This method uses a masking model previously proposed for image compression, in order to adapt the force of the watermarking to the characteristics of the human visual system. The model used makes it possible in particular to calculate the maximum weighting amplitude ($\alpha_j$) allowed with respect to each representative coefficient ($X_j$) modified.

According to this model, this maximum weighting amplitude $\alpha_j$ is calculated from the energy of coefficients representing the neighbourhood of the representative coefficient $X_j$ under consideration.

However, this method has the drawback of being of an analytical type, which entails many calculations for determining the parameters adapted to a given image. In addition, these parameters have to be recalculated for each image to be watermarked.

Moreover, it is known that the analytical masking models offer only an approximation of the masking effected by the human visual system.

SUMMARY OF THE INVENTION

The present invention aims to remedy the aforementioned drawbacks.

In this regard, the aim of the present invention is to propose a method of inserting a watermarking signal in an image by modifying coefficients representing the image, the modification of a coefficient under consideration taking into account the visual masking effect of the modification by the coefficients situated in a neighbourhood of the coefficient under consideration. The use of this method being very simple from the calculation point of view, and adaptive with respect to the type of images to be watermarked.

To this end, the present invention concerns a method of inserting a watermarking signal (w) in a set (X) of coefficients ($X_i$) representing a digital image (I), in which at least one subset of coefficients is modified by the watermarking signal (w). This method comprises, for each representative coefficient ($X_i$) to be modified, the following steps:

determining a neighbourhood ($V(X_i)$) of the representative coefficient ($X_i$) to be modified, in the image (I);

selecting a neighbourhood ($V_{sim}^d$) in a dictionary of neighbourhoods representing coefficients representing the image (I), according to a predetermined criterion of similarity with the neighbourhood ($V(X_i)$) of the representative coefficient ($X_i$); and modifying the representative coefficient ($X_i$) as a function of the watermarking signal (w) and a predetermined masking data item ($M(V_{sim}^d)$) representing the masking effect on a watermarking signal of the neighbourhood ($V_{sim}^d$) selected from the dictionary.

Taking into account a masking data item in the modification of a coefficient representing the image, it is possible to increase the degree of modification whilst meeting the invisibility criterion for the inserted signal. This makes it possible to obtain a better detectability of the watermarking signal in the watermarked image, or, at a fixed detectability level, to have a greater watermarking capacity, that is to say to be able to insert a larger number of watermarking bits. As this masking data item is obtained from a representative neighbourhood selected from a dictionary or stored table, the multiplication to be applied to the relevant coefficient of the image is calculated very rapidly.

According to a preferred embodiment of the invention, the method of inserting a watermarking signal comprises the following prior steps:

creating the said dictionary of neighbourhoods ($V^d$) representing the coefficients representing the image (I);

generating, for each neighbourhood ($V^d$) in the dictionary, a masking data item ($M(V^d)$) representing the masking effect of the neighbourhood on a watermarking signal.

Generating such a masking data item has the advantage of being able to use, when a watermarking signal is inserted, a psychovisual measurement of the modification made to the image, without using any analytical model. In addition, creating a dictionary of neighbourhoods allows an effective adaptation to the type of image processed.

According to a particular embodiment, the representative coefficients ($X_i$) are spatio-frequency coefficients obtained by a spatio-frequency transformation (T) of the image (I).

The representation of a spatio-frequency type is particularly adapted to an estimation of the masking effect since it corresponds to the representation of the human visual system, because of the separation of the image signal into two perceptual dimensions, frequency and orientation.

According to a preferred embodiment of the invention, the dictionary creation step comprises the following steps:

(A)—setting up a database of images, referred to as learning images, characteristic of a type of image to be watermarked;

(B)—for each learning image:
 (b1)—selecting the coefficients representing the learning image under consideration, obtained by transformation (T), belonging to at least one sub-band (SB) of the image under consideration; and,
 (b2)—for each coefficient ($X_i$) representing the sub-band (SB):
  determining a neighbourhood ($V(X_i)$) of the representative coefficient ($X_i$) under consideration in the learning image under consideration;
  calculating an energy ($E[V(X_i)]$) associated with the neighbourhood ($V(X_i)$) of the coefficient under consideration;
  storing the neighbourhood ($V(X_i)$) in a database, referred to as the learning vector base, if the calculated energy ($E[V(X_i)]$) of the neighbourhood is greater than a predetermined threshold (E0);

(C) applying a predetermined processing to the vectors of the learning vector base so as to calculate a smaller number of vectors, the said calculated vectors constituting the dictionary of neighbourhoods.

By obtaining a dictionary comprising a reduced number of vectors, the quantity of information to be taken into account and therefore the calculation complexity is reduced. In addition, the use of a thresholding with respect to a calculated energy of a neighbourhood makes it possible to take into account only the neighbourhoods which have a real masking effect.

According to one characteristic of the above preferred embodiment, the dictionary of neighbourhoods is obtained by vector quantisation of the learning vector base.

Vector quantisation is an effective normal technique for reducing the quantity of information (here the number of vectors) to be considered, that is to say obtaining a reduced number of vectors representing a large number of vectors.

According to a preferred embodiment of the invention, the step of generating, for each neighbourhood ($V^d$) in the dictionary, a masking data item ($M(V^d)$) representing the masking effect of the neighbourhood on a watermarking signal, comprises the following steps, for each neighbourhood ($V^d$) of the dictionary:

applying the inverse of the transform ($T^{-1}$) to the neighbourhood ($V^d$) so as to obtain the corresponding image ($I_d$);

modifying all the coefficients ($V_i^d$) of the neighbourhood ($V^d$) in successive stages, applying a modification value (M) varying according to an incrementation pitch (p) at each stage, and at each modification stage:
 applying the inverse transform ($T^{-1}$) to the said modified neighbourhood ($V^{*d}$) so as to obtain the corresponding modified image ($I'_d$);
 effecting a perceptual measurement ($MP(I_d, I^*_d)$) intended to evaluate a visual difference between the two images;
 comparing the result of the perceptual measurement with a predetermined threshold (JND);
 storing the modification value (M) when the result of the perceptual measurement reaches the predetermined threshold (JND), the modification value (M) stored constituting the masking data item ($M(V^d)$) associated with the neighbourhood ($V^d$) of the dictionary.

The use of a perceptual norm (JND threshold) avoids actual measurement by a human observer and therefore the subjectivity related to such a measurement.

According to one characteristic of the previous embodiment, the modification of each of the coefficients ($V_i^d$) of the neighbourhood ($V^d$) is carried out according to the following formula:

$$V^{*d}_i = V^d_i + M_i$$

in which $V^{*d}_i$ designates the modified coefficient and $M_i$ designates an estimated modification value (M) for the coefficient ($V_i^d$) under consideration.

More particularly, in this embodiment, the modification of all the coefficients ($V_i^d$) of the neighbourhood ($V^d$) in successive stages is effected according to the following formula:

$$V^{*d}_i = V^d_i + \alpha_i(1+M)$$

in which $V^{*d}_i$ designates the modified coefficient and $\alpha_i$ designates a weighting amplitude measured previously for the transformation (T) applied to a uniform image (that is to say with constant luminance, therefore creating no masking phenomenon), independently of the image, as a function of psychovisual criteria.

The use of this type of model expressed by the above formulae makes it possible to end up at the optimum case in terms of invisibility of the watermarking signal, independently of the image signal, when there is no masking effect. In addition, the model is controlled by a single parameter (M), which facilitates the use of a perceptual norm (JND threshold).

According to a particular embodiment of the invention, the step of modifying the representative coefficient ($X_i$) as a function of the watermarking signal (w) and a predetermined masking data item ($M(V_{sim}^d)$) representing the masking effect, is effected by modulation in accordance with the following formula:

$$X_i^* = X_i + A_i w_i$$

in which $X_i^*$ designates the modified representative coefficient $X_i$ and in which $A_i$ is a modulation amplitude calculated as a function of said masking data item ($M(V_{sim}^d)$) representing the masking effect on a watermarking signal, of the neighbourhood ($V_{sim}^d$) selected from the dictionary.

Thus the watermarking is effected at the limit of visibility taking into account the masking effect of the neighbourhood.

In the above embodiment, the modulation amplitudes $A_i$ are used in the choice of a subset of representative coefficients to be modulated.

In this way, the modulation amplitudes $A_i$ act in order to fix the detectability of the watermarking signal. This makes it possible in particular to increase the watermarking capacity (number of bits inserted) for a fixed degree of perceptibility.

According to a preferred embodiment of the invention, the transformation (T) applied to the image is a discrete wavelet transformation (DWT), and a neighbourhood of any representative coefficient $X_i$ of the image is determined as being the oriented tree of wavelet coefficients which is in the neighbourhood of the representative coefficient $X_i$, the root of said tree consisting of the coefficient, referred to as the parent coefficient, which corresponds to the highest decomposition level in the tree.

In this way, the masking effects are taken into account according to the orientation, in accordance with psychovisual studies.

According to a particular implementation characteristic of the invention, the watermarking signal (w) is a predetermined pseudo-random sequence with a null mean.

This makes it possible to improve the detectability of the inserted watermarking signal.

According to a second aspect, the present invention concerns a device for inserting a watermarking signal (w) in a set (X) of coefficients ($X_i$) representing a digital image (I), in which at least one subset of coefficients is modified by the watermarking signal (w).

In accordance with the invention this device comprises notably, for each representative coefficient ($X_i$) to be modified:

means of determining a neighbourhood ($V(X_i)$) of the representative coefficient ($X_i$) to be modified, in the image (I);

means of selecting a neighbourhood ($V_{sim}^d$) in a dictionary of neighbourhoods representing coefficients representing the image (I), according to a predetermined criterion of similarity with the neighbourhood ($V(X_i)$) of the representative coefficient ($X_i$); and means of modifying the representative coefficient ($X_i$) as a function of the watermarking signal (w) and a predetermined masking data item ($M(V_{sim}^d)$) representing the masking effect on a watermarking signal of the neighbourhood ($V_{sim}^d$) selected from the dictionary.

This insertion device has characteristics and advantages similar to those described above since it is adapted to implement the insertion method according to the invention.

The present invention also concerns a computer, a digital image processing apparatus, a digital printer, a digital photographic apparatus, a digital camera and a scanner having means adapted to implement the insertion method according to the invention.

Correlatively, the present invention also concerns a computer, a digital image processing apparatus, a digital printer, a digital photographic apparatus, a digital camera and a scanner comprising an insertion device according to the invention.

These appliances have advantages similar to those described for the insertion method which they implement.

The invention also relates to a computer program containing one or more sequences of instructions able to implement the method of inserting a watermarking signal according to the invention when the program is loaded and executed in a computer.

The invention also relates to an information carrier, such as a diskette or compact disc (CD), characterised in that it contains such a computer program.

The advantages of this device, this computer, this computer program and this information carrier are identical to those of the method as succinctly disclosed above.

Other particularities and advantages of the invention will also emerge from the following description of preferred embodiments of the invention.

BRIEF DESCRIPTION OF THE DRAWINGS

In the accompanying drawings, given by way of non-limitative examples.

DETAILED DESCRIPTION OF THE INVENTION

Figure 1:
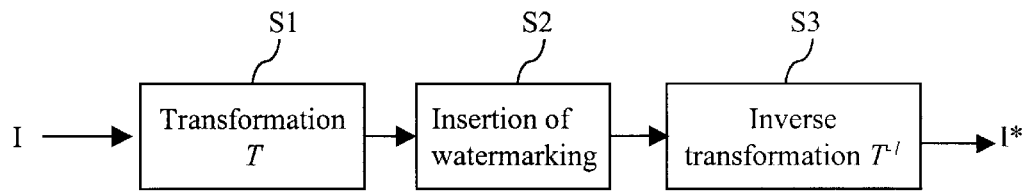
FIG. 1 is a block diagram illustrating a conventional method of inserting a watermarking signal in a digital image.

As illustrated in FIG. 1, in a conventional manner in the field of inserting a watermarking signal in a digital image I, a spectral or spatio-frequency transformation T is applied to the image to be watermarked I during a first step S1 so as to obtain a representation of the image in a spectral or hybrid spatio-frequency domain.

In this example, a spatio-frequency transformation T is used, based on a conventional wavelet decomposition ("Digital Wavelet Transform" DWT) which makes it possible to obtain hybrid coefficients, that is to say spectral coefficients also located in the plane of the image, in the spatial domain.

Figure 2:
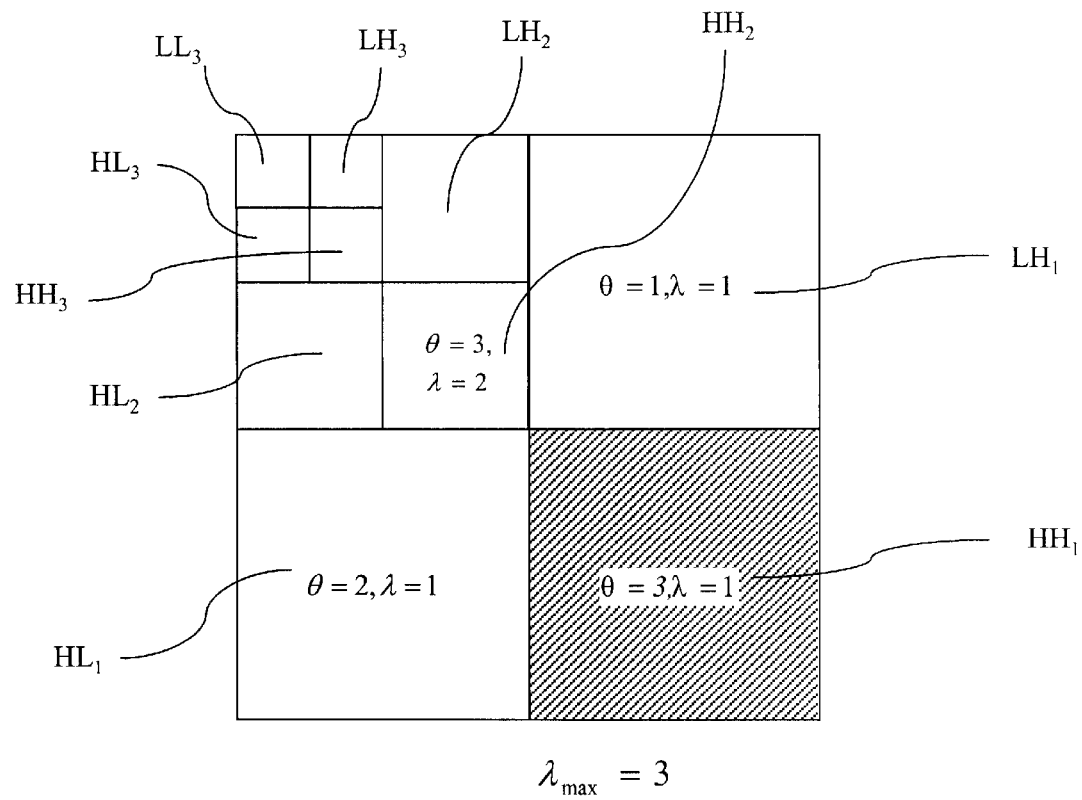
FIG. 2 illustrates the use of a multiresolution spatio-frequency decomposition on a digital image.

A diagram of conventional wavelet decomposition of an image is illustrated in FIG. 2 and the principle of such a multiresolution spatio-frequency decomposition is stated below.

The image I consists of a series of digital samples. The image I is for example represented by a series of bytes, each byte value representing a pixel of the image I, which can be a black and white image, with 256 grey levels.

The means of multiresolution spectral decomposition consist of a circuit for decomposing into sub-bands or analysis circuit, formed by a set of analysis filters, respectively associated with decimators by two. This decomposition circuit filters the image signal I in two directions, into sub-bands of low and high spatial frequencies. The circuit includes several successive analysis units for decomposing the image I into sub-bands according to several resolution levels.

By way of example, the image I is here decomposed into sub-bands at a maximum decomposition level equal to 3 ($\lambda_{max}=3$).

Each of the sub-bands is characterised by its decomposition level ($\lambda$) and its orientation ($\theta$).

A first analysis unit receives the image signal I and filters it through two digital filters, respectively low-pass and high-pass, in a first direction, for example horizontal. After passing through decimators by two, the resulting filtered signals are in their turn filtered by two filters respectively low-pass and high-pass, in a second direction, for example vertical. Each signal is once again passed through a decimator by two. There are then obtained, at the output of this first analysis unit, four sub-bands $LL_1$ ($\lambda=1$, $\theta=0$), $LH_1$ ($\lambda=1$, $\theta=1$), $HL_1$ ($\lambda=1$, $\theta=2$) and $HH_1$ ($\lambda=1$, $\theta=3$) with the highest resolution in the decomposition.

The sub-band $LL_1$ includes the components of low frequency in both directions of the image signal I. The sub-band $LH_1$ includes the components of low frequency in a first direction and high frequency in a second direction of the image signal I. The sub-band $HL_1$ includes the components of high frequency in the first direction and the components of low frequency in the second direction. Finally, the sub-band $HH_1$ includes the components of high frequency in both directions.

A second analysis unit in its turn filters the low-frequency sub-band $LL_1$ in order to supply in the same way four sub-bands $LL_2$ ($\lambda=2$, $\theta=0$), $LH_2$ ($\lambda=2$, $\theta=1$), $HL_2$ ($\lambda=2$, $\theta=2$) and $HH_2$ ($\lambda=2$, $\theta=3$) with an intermediate resolution level in the decomposition. Finally, in this example, the sub-band $LL_2$ is in its turn analysed by a third analysis unit in order to supply four sub-bands $LL_3$ ($\lambda=3$, $\theta=0$), $LH_3$ ($\lambda=3$, $\theta=1$), $HL_3$ ($\lambda=3$, $\theta=2$) and $HH_3$ ($\lambda=3$, $\theta=3$) with the lowest resolution in this decomposition.

In this way 10 sub-bands and three resolution levels are obtained. The sub-band with the lowest frequency $LL_3$ is referred to as the approximation sub-band and the other sub-bands are detail sub-bands.

Naturally, the number of resolution levels, and consequently of sub-bands, can be chosen differently, and can for example be equal to four resolution levels with 13 sub-bands.

As illustrated in FIG. 1, the watermarking signal is then inserted during an insertion step S2, in a set of coefficients of the domain transformed into sub-bands.

It is possible, for example, to choose the spectral coefficients of the high-frequency sub-band $HH_1$, at the first resolution level, corresponding to a high-pass filtering in the horizontal and vertical directions.

There is thus a set of spatio-frequency coefficients, with a cardinal equal to N, denoted for example $X=\{X_i, 1 \leq i \leq N\}$.

For an image I of size 512×512, the sub-band $HH_1$ is of size N 256×256.

Since the watermarking has to be imperceptible and indelible, and therefore difficult to locate and remove by pirating, it is chosen to insert a pseudo-random watermarking signal, spreading its spectrum in order to make this signal undetectable by spectral or statistical analysis.

A pseudo-random sequence w is, for example, considered, which follows a uniform law on the interval [−1, 1] with $w=\{w_i, 1 \leq i \leq P\}$, the length P of the sequence being less than or equal to N.

Naturally, any pseudo-random watermarking signal, with a known distribution and a null mean, may suit. The most usual distributions for the watermarking signal w are, in addition to the aforementioned uniform distribution on [−1, 1], the binary distribution {−1, 1} and the centred standardised Gaussian distribution N(0, 1).

Figure 3:
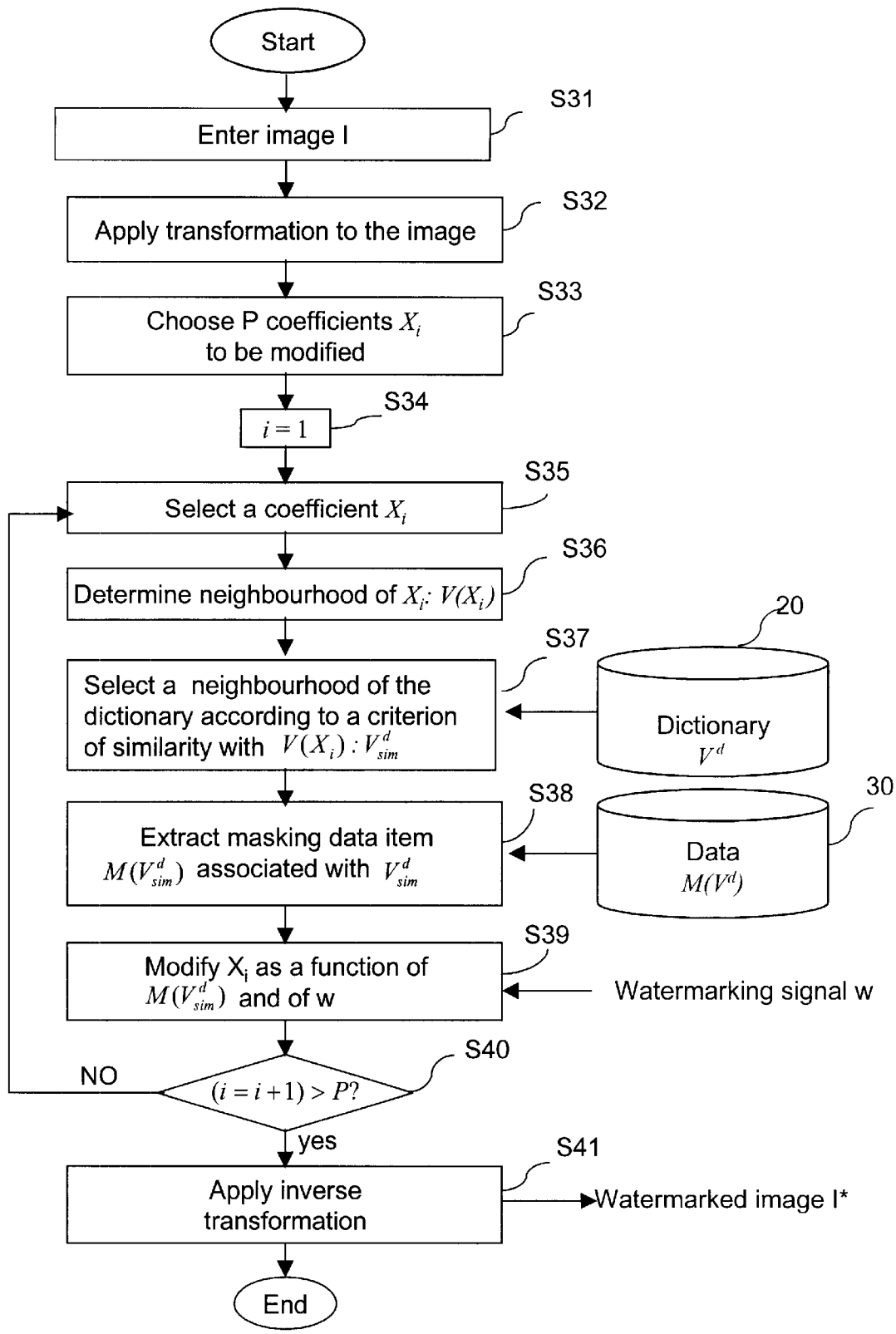
FIG. 3 depicts a general flow diagram illustrating a method of inserting a watermarking signal in a digital image, in accordance with the present invention.

With reference to FIG. 3, a description will now be given of the general method of inserting a watermarking signal in a digital image, in accordance with the present invention.

In the flow diagram of FIG. 3, an image (I) to be "watermarked" is first of all input (step S31) in the form of an image signal, for example a representation of the image in bitmap mode.

A spatio-frequency transformation, denoted T, is then applied (step S32) to this image signal, which gives a set of coefficients (X) representing the image (I).

At the following step (S33), there is chosen amongst the set of representative coefficients obtained after transformation a subset of coefficients which will be modified so as to insert the watermarking signal (w) in the image.

Steps S35 to S39 will now be repeated for each coefficient to be modified according to a loop. To this end, the first step is to initialise a counter i to 1 at step S43, the value of this counter being tested at the test step S40.

At this latter step (S40), first of all the counter is incremented, and then it is tested whether or not the value of the counter is greater than the number P of coefficients representing the image which are to be modified. If such is the case, the loop is left in order to pass to the following step (S41). In the contrary case, the loop is recommenced, selecting (S35) the coefficient of the following image (since the counter i has been incremented).

Within the loop, steps S36 to S39 are repeated for each current selected coefficient $X_j$.

In accordance with the present invention, a neighbourhood, denoted $V(X_i)$, of the current coefficient is first of all determined at step S36. An example of the determination of a neighbourhood of a coefficient will be described below in relation to FIG. 4.

At the following step (S37), a neighbourhood, denoted $V_{sim}^d$, is selected in a dictionary 20 of neighbourhoods representing coefficients representing the image (I). In the preferred embodiment of the invention, the dictionary is previously created, but it could also be a case of a dictionary already existing for a given type of image to which the image I to be watermarked belongs. In the context of the present invention, the type of an image is defined by the visual content of the image.

In accordance with the invention, the neighbourhood ($V_{sim}^d$) of the dictionary is selected (S37) according to a predetermined criterion of similarity with the neighbourhood ($V(X_i)$) of the current representative coefficient ($X_i$).

It is for example possible to use a resemblance criterion using a measurement of quadratic distance between two vectors. A psychovisual distance could also be used.

In accordance with the invention, each neighbourhood $V^d$ of the dictionary is associated with a predefined masking data item, denoted $M(V^d)$, and representing the masking effect, on a watermarking signal, of the relevant neighbourhood $V^d$ of the dictionary. The set of masking data associated with the neighbourhoods in the dictionary is designated here by the expression "masking database".

In practical terms, the neighbourhoods in the dictionary and the associated masking data are computer data stored in an adapted memory of a device implementing the method according to the invention. An example of a device will be described below in relation to FIG. 11.

Returning to FIG. 3, at the following step S38, the masking data $M(V_{sim}^d)$ associated with the neighbourhood $V_{sim}^d$ in the dictionary selected at the previous step (S37) is extracted from the masking database 30.

At the following step S39, according to the invention, the current representative coefficient $X_i$ is modified as a function of the watermarking signal w and the masking data item $M(V_{sim}^d)$ representing the masking effect on a watermarking signal, of the neighbourhood $V_{sim}^d$ selected in the dictionary for the current representative coefficient.

When steps S36 to S39 have been implemented for all the representative coefficients chosen to be modified, the final step S41 is passed to, in which there is applied, to all the coefficients representing the image I, the transformation, denoted $T^{-1}$, which is the inverse of the transformation T initially applied to the image I, at step S32.

In this way, a watermarked image, denoted I*, resulting from the initial image I in which the watermarking signal w has been inserted, is obtained.

In accordance with the preferred embodiment of the invention, the method of inserting a watermarking signal includes two prior steps. In a first step, the dictionary (20) containing neighbourhoods ($V^d$) representing the coefficients representing the type of image (I) to be watermarked is created. In a second step, for each neighbourhood ($V^d$) of the dictionary, a masking data item ($M(V^d)$) is generated, representing the masking effect of the neighbourhood on any watermarking signal. In other words, in this second step the masking database (30) is created.

The methods used according to the invention for creating the dictionary and masking database will be described below in relation to FIGS. 5 and 6.

Figure 4:
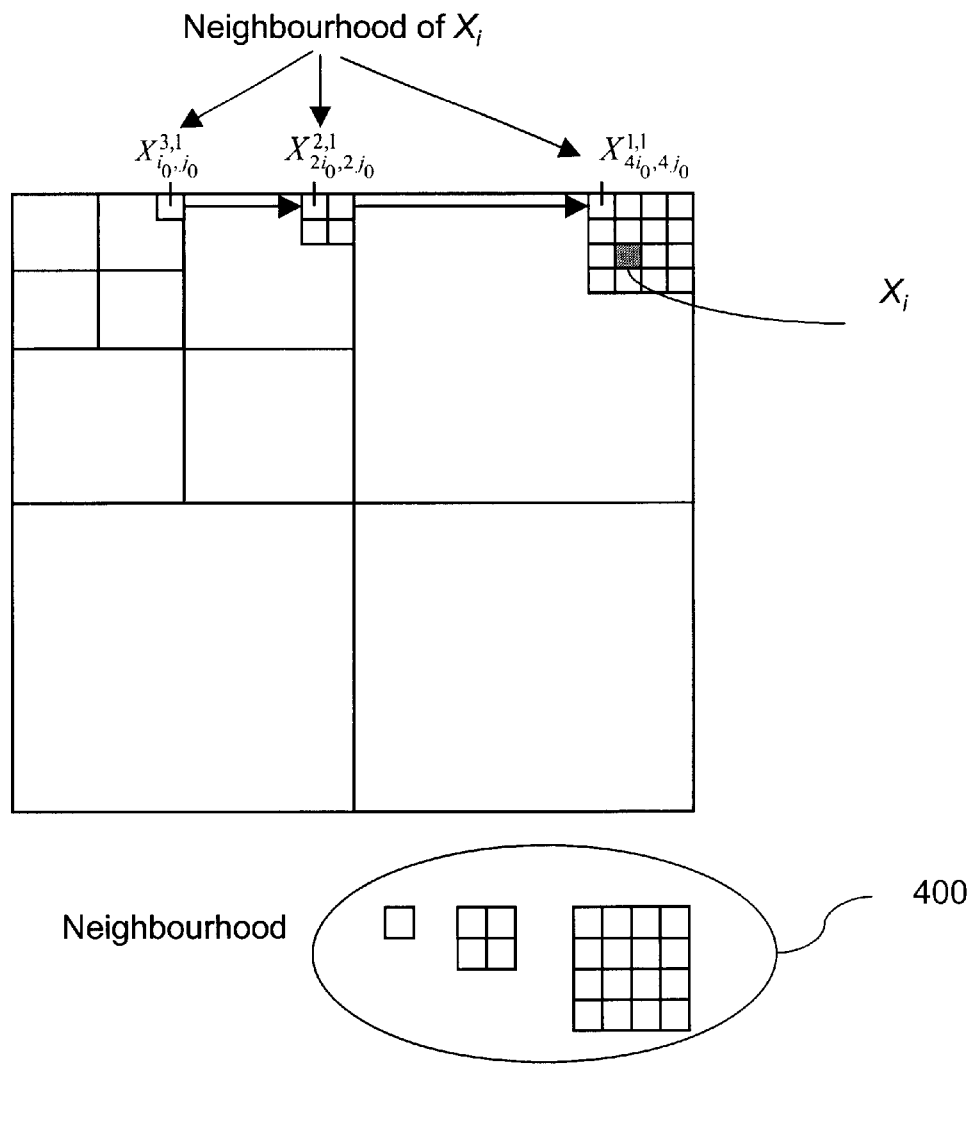
FIG. 4 illustrates how a neighbourhood of a coefficient representing an image to be watermarked is determined, in accordance with a preferred embodiment of the invention.

With reference now to FIG. 4, it will be described in which way a neighbourhood of a coefficient representing an image to be watermarked is selected, in accordance with the preferred embodiment of the invention.

In this embodiment, a spatio-frequency transformation T based on a conventional wavelet decomposition (DWT) is used. A conventional wavelet decomposition scheme for an image was previously described in relation to FIG. 2.

The transformation in the context of this embodiment is more precisely a discrete wavelet transformation, for example with 9-7 biorthogonal filters. To obtain more details on this transformation, reference can be made to the article entitled "*Image coding using wavelet transform*" by M. Antonini et al., IEEE Transactions on Image Processing, 1(2), 1992.

This transformation includes three decomposition levels ($\lambda_{max}=3$), $\lambda$ designates the decomposition level and $\theta$ designates the orientation of each sub-band.

So as to simplify the notation, $X_i^{\lambda,\theta}$ is used to designate the coefficients in the transformed domain belonging to the sub-band with decomposition level $\lambda$ and orientation $\theta$.

$N(\lambda, \theta)$ designates the number of coefficients associated with this sub-band. The index i therefore varies between 1 and $N(\lambda,\theta)$. In reality, the index i comprises two sub-indices, a row sub-index and a column sub-index.

In accordance with this embodiment of the invention, a neighbourhood, referred to as a masking neighbourhood, of a given representative coefficient $X_i^{\lambda,\theta}$ of the image to be watermarked is defined as the oriented tree of wavelet coefficients which is in the neighbourhood of the coefficient. The root of this tree consists of the coefficient, referred to as the parent coefficient, which corresponds to the highest decomposition level of the tree. Such an oriented tree is illustrated in FIG. 4.

In the example in FIG. 4, the neighbourhood of a coefficient $X_i$ belonging to the sub-band (1, 1) has as its parent coefficient the coefficient $X_{i0,j0}^{3,1}$. As can be seen, the oriented tree is considered at a constant orientation ($\theta$).

Thus a coefficient tree is defined using its depth p, defined as the number of levels minus one ($\lambda_{max}-1$), and the parent coefficient, denoted $X^P$. The number of coefficients (size) which make up such a neighbourhood $V(X^P)$ is consequently obtained by means of the following formula:

$$\text{Size}[V(X^P)] = 1 + 2 \times 2 + 2^2 \times 2^2 + \ldots + 2^P \times 2^P \qquad (1)$$

In the remainder of the description, this size is denoted "Q".

The coefficient tree thus defined is the neighbourhood of each of the coefficients which make it up, which makes it possible to effect a partitioning of the space of the psychovisual neighbourhoods in a representation in sub-bands. Moreover, such a tree consists of a set of coefficients belonging to various decomposition levels (that is to say, various spectral sub-bands).

In the case of a wavelet representation with 3 decomposition levels, each coefficient tree or neighbourhood 400 (FIG. 4) contains 21 coefficients (p=2 in formula (1) above).

In order to simplify the notation, in the context of this disclosure $V(X_i)$ represents the neighbourhood of any coefficient $X_i$ selected according to the method described above in relation to FIG. 4. The neighbourhood of any coefficient $X_i$ thus obtained can therefore be considered to be a unidimensional vector of size 21, each of whose components, denoted $V_j$, is a particular coefficient of the coefficient tree containing the coefficient $X_i$.

It should be noted that it is possible to use a method of selecting a neighbourhood other than the one presented in the context of this embodiment. It is for example possible to define a masking neighbourhood of a given coefficient as the complete tree, including all orientations, containing this coefficient. In this case, a neighbourhood will include three elements each defining a neighbourhood as defined above in relation to FIG. 4.

Figure 5:
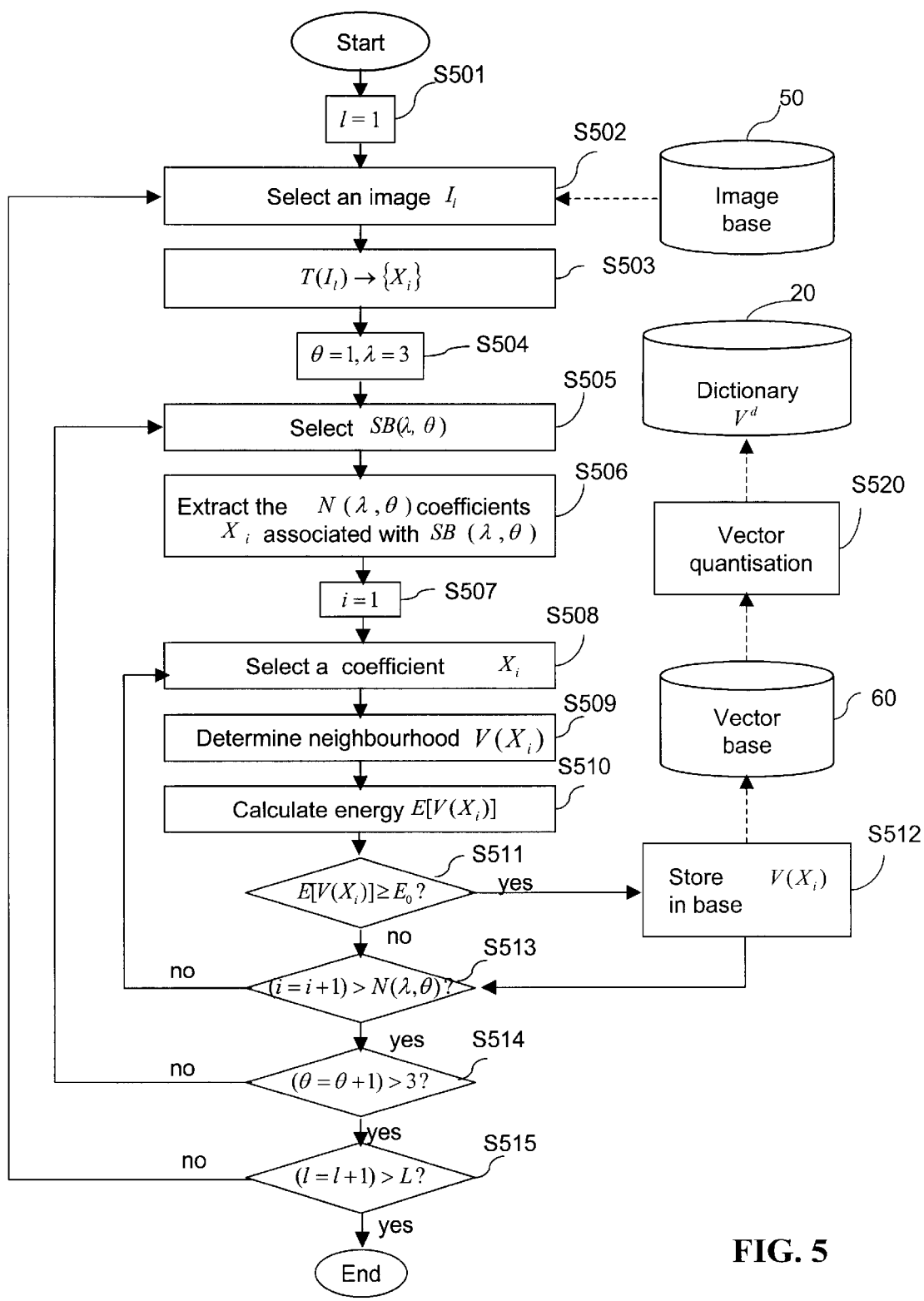
FIG. 5 depicts a flow diagram illustrating a method of creating a dictionary of neighbourhoods, in accordance with a preferred embodiment of the invention.

With reference now to FIG. 5, a description will be given of the method of creating a dictionary of neighbourhoods, in accordance with a preferred embodiment of the invention.

The method of creating a dictionary of neighbourhoods commences with an initialisation step (S501) in which a counter I, used subsequently, is initialised to 1.

At the following step (S502) an image $I_I$ is selected from amongst a set of images stored in an image base 50, referred to as a learning image base, commencing with a first image referenced by the index 1 (since I=1).

This image database 50 was formed previously and contains digital images chosen by the fact that they are characteristic of a type of image to which the image or images on which it is wished to proceed with the insertion of a watermarking signal belong. These images are characteristic of the type of images to be watermarked, for example because their visual content includes the same type of element: natural landscapes, urban landscapes, portraits of people, etc.

This learning image database can, by way of example, contain a minimum number of thirty images of size 512 by 512, corresponding to approximately 250,000 learning vectors according to the richness of the content of the images to be represented.

Once an image has been selected (S502), at the following step (S503) a transform T, the same as that used for the image I to be watermarked (see FIG. 3), is applied to this image. As mentioned previously, this transform is a spatio-frequency transformation based on a wavelet decomposition in the preferred embodiment of the invention.

In this way a set of spatio-frequency coefficients $X_i$ is obtained, representing the relevant image $I_I$ of the image base 50.

At the following step (S504), two counters $\lambda$ and $\theta$ are initialised, representing respectively the decomposition level and orientation considered. We thus begin with the horizontal orientation ($\theta=1$) and the maximum decomposition level ($\lambda_{max}$), that is to say 3 in the present case.

At the following step S505, the corresponding sub-band SB($\lambda$, $\theta$) is selected. As $\theta$ has been initialised to 1, all the maximum decomposition sub-bands are selected with the exception of the low-frequency sub-band $LL_3$, commencing with the sub-band $LH_3$.

At the following step S506, all the N($\lambda$,$\theta$) coefficients associated with the sub-band SB($\lambda$,$\theta$) under consideration are extracted.

The following step S507 is an initialisation step in which a counter i is initialised to 1.

The following steps S508 to S511 are repeated for each of the extracted coefficients $X_i$ (step S506) for the sub-band under consideration, commencing with the one with index 1.

After selecting a coefficient at step S508, its neighbourhood $V(X_i)$ is selected, as previously explained in relation to FIG. 4.

At step S510, an energy $E[V(X_i)]$ associated with the neighbourhood ($V(X_i)$) of the coefficient under consideration is calculated.

In one embodiment of the invention, this energy is calculated according to the following formula:

$$E[V(X_i)] = \frac{1}{Q}\sum_{q=1}^{Q} p_q V_q^2 \quad (2)$$

where Q designates the number of coefficients in the neighbourhood under consideration (the size of the neighbourhood), $V_q$ designates any coefficient in the neighbourhood and $p_q$ a weighting coefficient between zero and one.

In the preferred embodiment of the invention, Q is equal to 21 and all the coefficients $p_q$ are equal to 1.

The following step S511 is a test step in which a test is carried out on the energy calculated for the neighbourhood under consideration with respect to a predetermined threshold E0 (E0=50, for example).

If the energy calculated for the neighbourhood under consideration is greater than this threshold, the neighbourhood ($V(X_i)$) is stored (S512) in a database 60, referred to as the learning vector base, and then step S513 is passed to.

In the contrary case, step S513 is passed to directly without storing the neighbourhood. At this step, the counter i is first of all incremented, and then its value is compared with the total number N($\lambda$,$\theta$) of coefficients in the sub-band under consideration.

If the value of the counter i is greater than this number (N($\lambda$,$\theta$)), this means that all the coefficients of the sub-band under consideration have been selected, and in this case the following step (S514) is passed to.

In the contrary case step S508 is returned to in order to select another coefficient and steps S509 to S513 are recommenced as before.

When all the coefficients of the sub-band under consideration have been processed, step S514 is passed to, in which it is tested whether all the sub-bands (of decomposition level 3) of orientation $\theta$ varying from 1 to 3 have been processed.

In the negative, step S505 is returned to in order to select the sub-band corresponding to $\theta+1$, since the counter $\theta$ was incremented at step S514, and steps S506 to S513 are recommenced for this sub-band.

In the contrary case, the test step S515 is passed to, in which first of all the counter I is incremented, and then the value of the counter is compared with the number L of images stored in the learning database 50.

If the value of the counter is strictly greater than L, this means that all the images of the base 50 have been processed.

In the contrary case, step S502 is returned to in order to select a new image, and the process recommences as before.

In summary, as disclosed above, for each learning image, the coefficients representing the image, belonging to at least one sub-band (SB) of the image under consideration, are selected (S505). In the embodiment described, the sub-bands of the maximum decomposition level ($\lambda=3$) and with an orientation ($\theta$) varying between 1 and 3 are considered, that is to say the sub-bands: $LH_3$, $HL_3$, $HH_3$ (see FIG. 2). Then, for each of these sub-bands, a neighbourhood is determined for each of the coefficients ($X_i$) representing the sub-band. Next (S510) an energy ($E[V(X_i)]$) associated with the neighbourhood ($V(X_i)$) of the coefficient under consideration is calculated. Finally, the neighbourhood ($V(X_i)$) is stored (S512) in the learning vector base (60), if the calculated energy ($E[V(X_i)]$) of the neighbourhood is greater than a predetermined threshold (E0).

Once the learning vector base has been set up, the learning vectors are processed (S520) so as to calculate a smaller number of vectors, referred to as vectors representing the learning vector base. The result of this selection is stored in another database 20, referred to as the dictionary of neighbourhoods.

In a preferred embodiment of the invention, the representative vectors (neighbourhoods) of the dictionary 20 are obtained (S520) by vector quantisation of the vectors of the learning vector base 60, in accordance with a method known as the "Kohonen method". In order to obtain more details on this method reference can be made to the article entitled *"Vector quantization of images based upon the Kohonen self-organizing feature map"*, by N. M. Nasrabadi and Y. Feng, Proc. of IEEE International Conference on Neural Networks, pages 101–107, 1988.

It should be noted that any other vector quantisation method can be used, in particular the methods described in the work entitled *"Vector quantization and signal compression"* by A. Gersho and R. M. Gray, Kluwer Academic Publishers, 1992.

In a preferred embodiment of the invention, the number of neighbourhoods contained in the dictionary (20) is 512.

The method used according to the invention for creating the masking database 30 (see FIG. 3) associated with the dictionary 20 will now be described.

Figure 6:
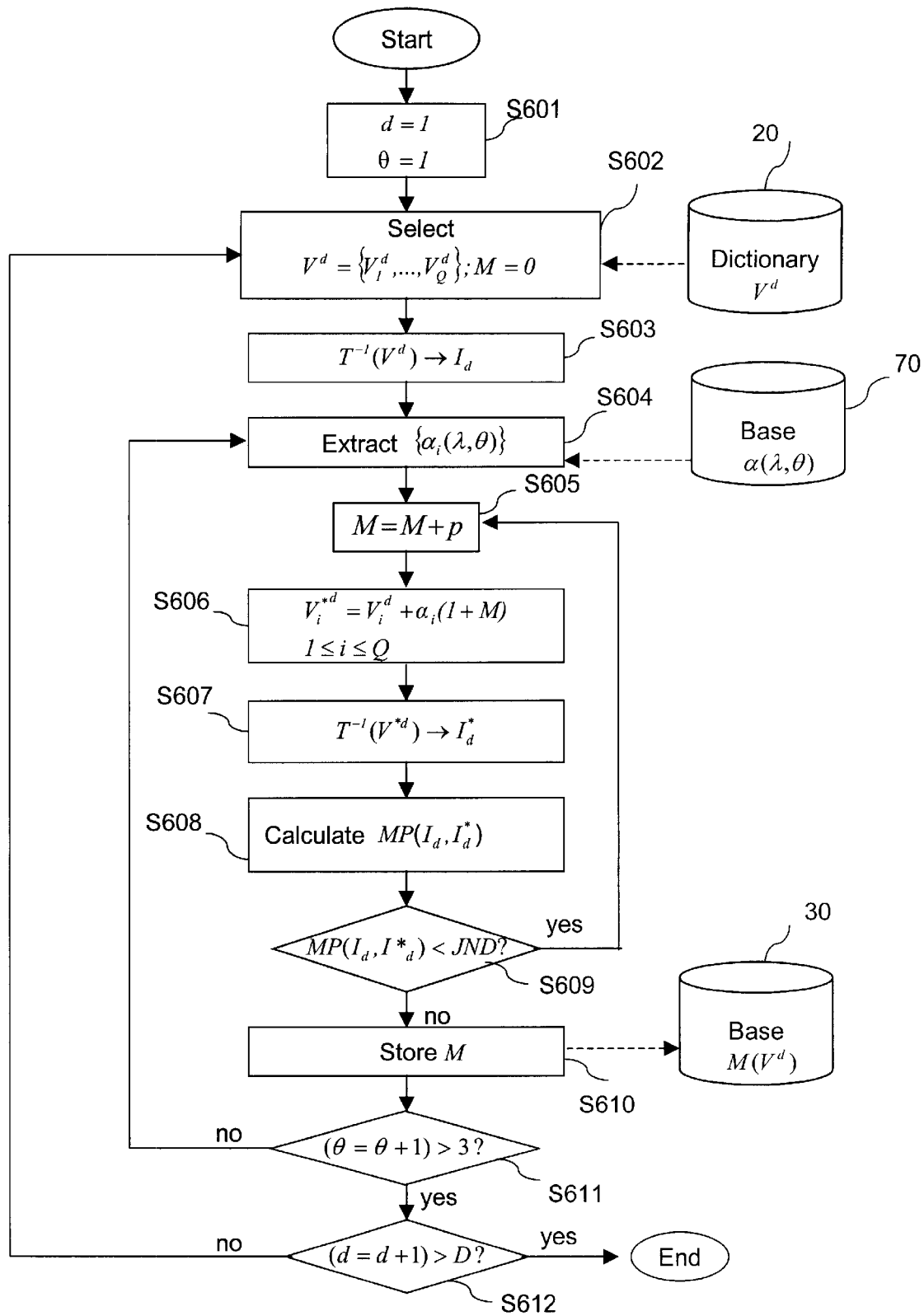
FIG. 6 depicts a flow diagram illustrating a method of generating a masking data item associated with each of the neighbourhoods of the dictionary, in accordance with a preferred embodiment of the invention.

With reference to FIG. 6, a flow diagram is depicted, illustrating the method of generating a masking data item associated with each of the neighbourhoods of the dictionary according to a preferred embodiment of the invention.

In FIG. 6, the method of generating a masking data item commences with an initialisation step (S601), in which a certain number of variables used subsequently are initialised.

The following steps S602 to S603 are then repeated in a loop controlled by the test step S612 in which a comparison is made of a counter d (initialised to 1 at step S601) with respect to the total number D of neighbourhoods in the dictionary (20). If this counter, previously incremented, is strictly greater than D, the loop is left, whilst the loop is once again returned to (at step S602) in the contrary case.

Thus for each neighbourhood $V^d$ of the dictionary selected at step S602, first of all (S603) the inverse of the discrete wavelet transform T, denoted $T^{-1}$, is applied, so as to obtain the corresponding image ($I_d$).

At the following step S604, weighting amplitudes denoted $\alpha_i(\lambda,\theta)$ of a database 70 previously set up and designated by the expression "amplitude base" are extracted.

This set of amplitudes $\alpha(\lambda,\theta)$ consists of weighting amplitudes corresponding to each decomposition level $\lambda$ and to each orientation $\theta$, previously measured for the transformation (T) applied to a uniform image, independently of the image, as a function of psychovisual criteria.

The amplitudes extracted at step S604 consequently correspond to the decomposition level ($\lambda$) and orientation ($\theta$) of the sub-bands to which the coefficients of the relevant neighbourhood $V^d$ of the dictionary belong. For example, if the orientation $\theta=1$ is considered, for each of the selected neighbourhoods (S602), the following three amplitudes are extracted: $\alpha(3, 1)$, $\alpha(2, 1)$, $\alpha(1, 1)$.

At the following step S605, a modification variable M is incremented at an incrementation pitch p. Previously, at step S602, M was set to zero. In practice, in the embodiment described, the value of the incrementation pitch p is chosen so as to be equal to 0.01.

At the following step S606, all the coefficients ($V_i^d$) of the neighbourhood ($V^d$) of normal orientation $\theta$ ($\theta$ was initialised to 1 at step S601) are modified, in accordance with a preferred embodiment of the invention, according to the formula:

$$V^{*d}_i = V_i^d + \alpha_i(1+M) \tag{3}$$

in which $V^{*d}_i$ designates the modified coefficient and $\alpha_i$ designates the extracted amplitude corresponding (as a function of $\lambda$ and $\theta$) to the relevant coefficient $V_i^d$ of the neighbourhood.

In general terms, according to the invention, each coefficient ($V_i^d$) of a neighbourhood ($V^d$) selected (step S602) is modified according to the following general formula:

$$V^{*d}_i = V_i^d + M_i \tag{3'}$$

where $M_i$ designates an estimated modification value (M) for the coefficient ($V_i^d$) under consideration.

The index i varies between 1 and Q, the total number of coefficients in the neighbourhood. It should be stated here that Q is equal to 21 in a preferred embodiment of the invention (see FIG. 4).

At the following step S607, the inverse transform ($T^{-1}$) is applied to the modified neighbourhood, denoted $V^{*d}$, so as to obtain the corresponding modified image, denoted $I^*_d$.

At the following step S608, a perceptual measurement is made, denoted $MP(I_d, I^*_d)$ intended to evaluate a visual difference between the images, $I_d$ and $I^*_d$, obtained previously.

Next (step S609) the result of this perceptual measurement is compared with a predetermined JND threshold (JND: meaning "just noticeable difference"). In order to obtain more information on the JND threshold, reference can be made, for example, to the work entitled *"Digital images and human vision"* by A. B. Watson, Cambridge Mass., MIT Press, 1993.

If the result of the measurement is strictly greater than the JND threshold, step S605 is returned to, in which the modification variable M is once again incremented in the state in which it is situated by the incrementation pitch p, and the steps which follow are recommenced as previously disclosed.

On the other hand, in the contrary case, step S610 is passed to, in which the modification value M is stored in the base 30 as forming part of the masking data item associated with the selected neighbourhood of the dictionary. The value of M corresponds to the value of the masking data item corresponding to the current orientation $\theta$.

Consequently, as the coefficients of orientation $\theta$ equal to 1, and then 2, and finally 3, are successively processed, each masking data item $M(V^d)$ associated with any neighbourhood $V^d$ of the dictionary contains three values of the modification coefficient M: $M_1$, $M_2$, $M_3$, corresponding to the three possible orientations of the coefficients: $M(V^d) = (M_1, M_2, M_3)$ At the following step S611 the variable $\theta$ representing the orientation is first of all incremented, and the variable is compared with respect to 3. If the value of $\theta$ is less than or equal to 3, step S604 is returned to in order to process the coefficients of the selected neighbourhood ($V^d$) of current orientation $\theta$, and the cycle recommences as before.

In the contrary case (the value of $\theta$ is strictly greater than 3) this means that all the coefficients of the neighbourhood under consideration have been processed, having considered first of all the orientation 1 and then 2 and then finally 3.

In the latter contrary case, the test step S612 is passed to, in which it is determined whether all the neighbourhoods of the dictionary have been processed. In the negative step S602 is returned to in order to select another neighbourhood $V^d$ (d has been incremented) and the process recommences for this neighbourhood. In the affirmative, the process of generating the masking data is terminated.

In summary, as disclosed above, the method of generating the masking data associated with the neighbourhood of the dictionary includes the following principal steps. To each selected neighbourhood ($V^d$) of the dictionary, the inverse transform ($T^{-1}$) is first of all applied (S603) so as to obtain the corresponding image ($I_d$). Next all the coefficients ($V_i^d$) of the current neighbourhood ($V^d$) are modified (S606) in successive steps, applying a modification value (M) varying according to an incrementation pitch (p) at each step. Moreover, at each modification step, the inverse transform ($T^{-1}$) is applied (S607) to the neighbourhood thus modified ($V^{*d}$) so as to obtain the corresponding modified image ($I^*_d$). Then a perceptual measurement ($MP(I_d, I^*_d)$) is effected (S608), intended to evaluate a visual difference between the two images; and the result of this perceptual measurement is compared (S609) with a predetermined threshold (JND). Finally, the modification value (M) is stored (S601) when the result of the perceptual measurement reaches the predetermined threshold (JND). The modification value (M) stored constitutes the masking data item ($M(V^d)$) associated with the selected neighbourhood ($V^d$) of the dictionary.

It should be noted here that, in the method of generating the masking data which has just been described, these masking data ($M(V^d)$) are obtained in accordance with a technique of measuring (S609) the perceptual distance between the two images $I_d$ and $I^*_d$. This measurement is a visibility measurement effected by human observers and consists, for observers, of judging whether or not the modification effected in the image $I^*_d$ is visible in comparison with the image $I_d$. In the affirmative, it is considered that the perceptual distance is greater than the visibility threshold (JND). In the negative, it is considered that the perceptual distance is less than this threshold.

According to a variant embodiment of the invention, it is also possible to generate the masking data by a calculation technique, using a perceptual norm analytical model. For example, use can be made of the model described in the abovementioned work entitled "*Digital images and human vision*" by A. B. Watson, Cambridge Mass., MIT Press, 1993.

In relation now to FIG. 7, a description will be given of a method of inserting a watermarking signal in an image by modifying the coefficients representing the image, according to a preferred embodiment of the invention in which the modification of the coefficients is effected by modulation.

Figure 7:
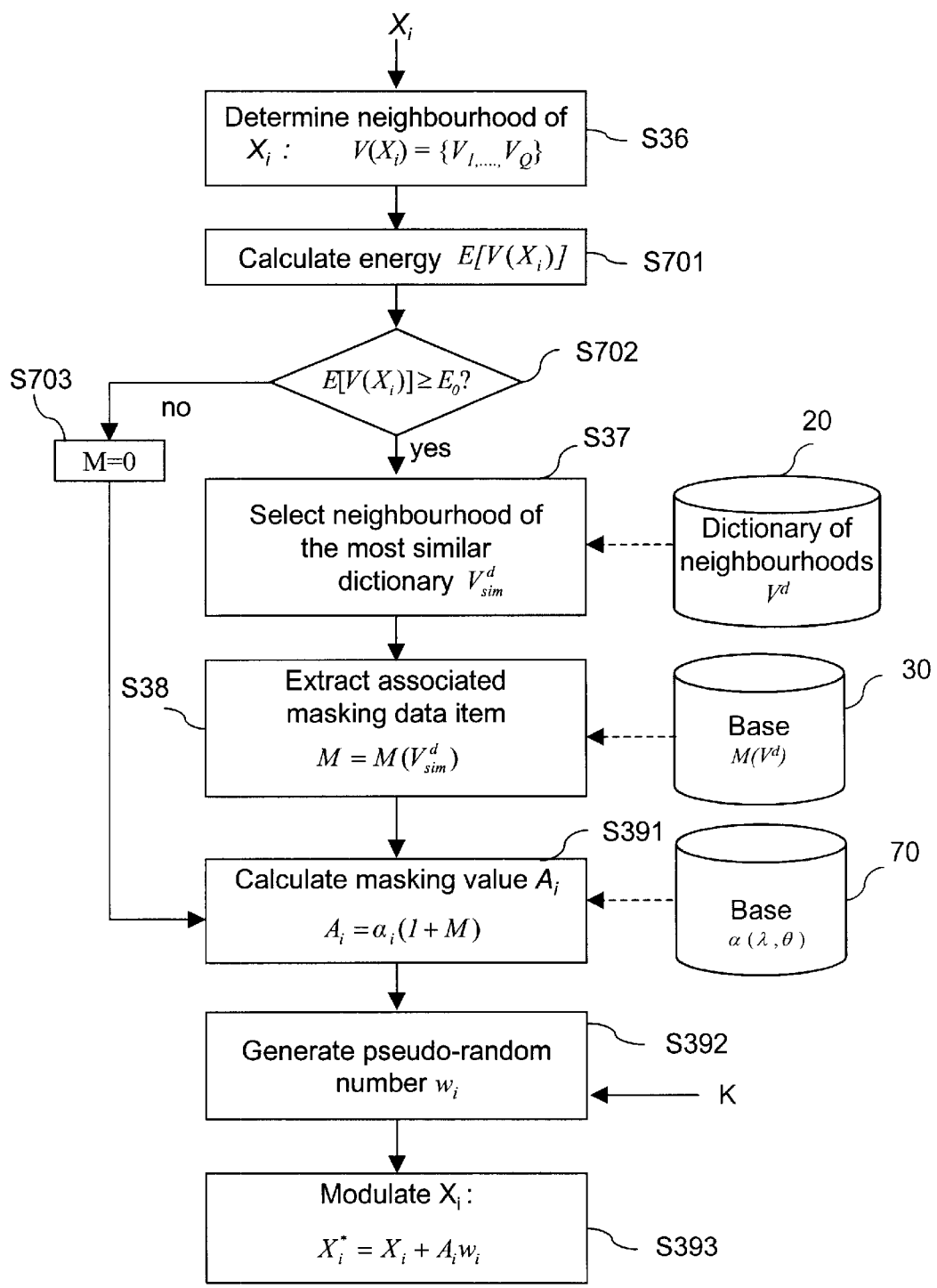
FIG. 7 depicts a flow diagram illustrating a method of inserting a watermarking signal by modulation of coefficients according to a preferred embodiment of the invention.

The method illustrated in FIG. 7 commences at step S36 of FIG. 3, in which, for each coefficient $X_i$ of the subset of P coefficients chosen to be modified (FIG. 3, S33), a neighbourhood ($V(X_i)$) is determined according to the method disclosed above in relation to FIG. 4.

Next (S701) an energy $E[V(X_i)]$ associated with the neighbourhood ($V(X_i)$) of the coefficient under consideration is calculated (in accordance with formula (2) above).

The following step S702 is a test step in which it is determined whether or not the energy calculated for the neighbourhood under consideration is greater than a predetermined threshold E0.

In the negative, a variable M is set to zero (S703), and then a step (S391) of calculating a masking value described below, with M equal to zero, is passed to directly.

In the contrary case, it is considered that the energy calculated for the neighbourhood is sufficiently great (greater than E0) to be significant. In this case, step S37 is passed to (identical to that of FIG. 3), in which a neighbourhood of the dictionary 20 "most similar" to the current neighbourhood is selected.

At the following step S38, as in FIG. 3, the masking data $M(V_{sim}^d)$ associated with the selected neighbourhood $V_{sim}^d$ of the dictionary is extracted. This masking data item, as previously mentioned in relation to FIG. 6, contains three values of the modification coefficient M: $M_1$, $M_2$, $M_3$, corresponding to the three possible orientations of the coefficients.

At the following step S391, a masking value $A_i$ associated with each coefficient $V_q$ is calculated (with q between 1 and Q=21) of the neighbourhood $V(X_i)$ of the coefficient $X_i$ to be modified. This masking value $A_i$ is obtained by means of the following formula:

$$A_i = \alpha_i(1+M) \quad (4)$$

in which $\alpha_i$ is an amplitude extracted from the amplitude base 70 whose definition was given above in relation to FIG. 6. The value of $\alpha_i$ extracted corresponds to the orientation $\theta$ and to the decomposition level $\lambda$ of the coefficient $V_q$ of the neighbourhood under consideration. Likewise, the masking data item M extracted is one of the values $M_1$, $M_2$ or $M_3$ corresponding to the orientation $\theta$ of the coefficient $V_q$.

At the following step S392, a random number $w_i$ is generated. This is because the watermarking signal w is here obtained by generating a pseudo-random sequence of numbers from a key (K).

For example, a pseudo-random sequence w is considered which follows a uniform law on the interval [-1, 1]. Naturally, any pseudo-random watermarking signal, with a known distribution and a null mean, can be suitable. The most usual distributions for the watermarking signal w are, apart from the aforementioned uniform distribution on [-1, 1], the binary distribution {-1, 1} and the centred standardised Gaussian distribution N(0, 1).

Finally, at step S393, the coefficient $X_i$ is modified by modulation according to the following formula:

$$X_i^* = X_i + A_i w_i \quad (5)$$

in which $X_i^*$ designates the coefficient $X_i$ thus modified.

Finally, $A_i$ is a weighting amplitude calculated as a function of the masking data item ($M(V_{sim}^d)$) representing the masking effect on a watermarking signal, of the neighbourhood ($V_{sim}^d$) selected in the dictionary as being the most similar to the neighbourhood $V(X_i)$ determined for $X_i$.

In the embodiment described above, $A_i$ is also a function of a predefined weighting amplitude $\alpha_i$ independent of the image to be watermarked.

It should be noted that the amplitude $A_i$ is greater than the weighting amplitude $\alpha_i$. This makes it possible to obtain a better detectability of the watermarking signal in the watermarked image or, for a fixed detectability level, to have a greater watermarking capacity, that is to say to be able to insert a larger number of watermarking bits.

Figure 8:
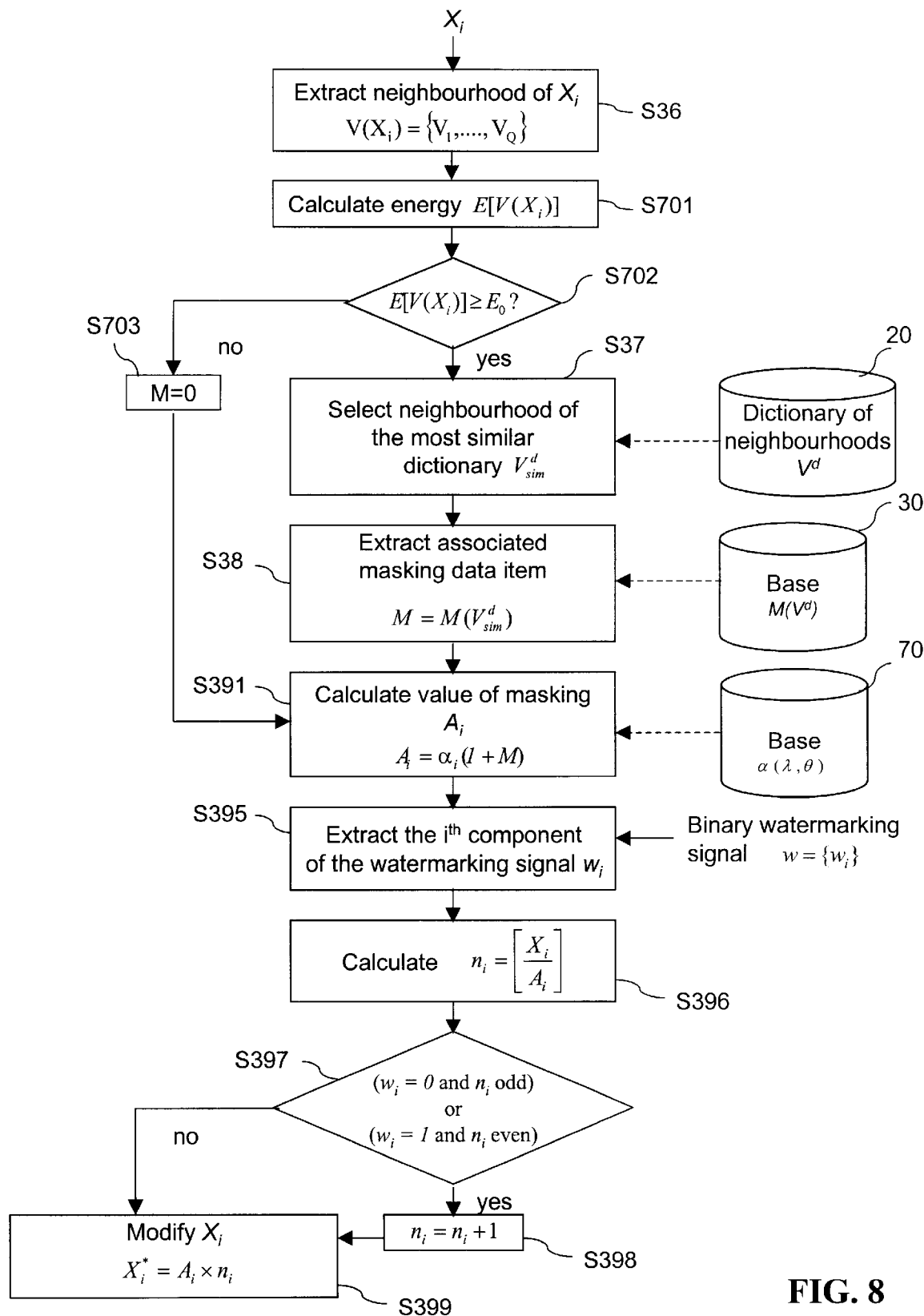
FIG. 8 depicts a flow diagram illustrating a method of inserting a watermarking signal by modifying coefficients according to another embodiment of the invention.

With reference now to FIG. 8, a description will be given of a method of inserting a watermarking signal by modifying the coefficients representing the image to be watermarked, according to another embodiment of the invention.

In FIG. 8, steps S36 to S38, S701 to S703 and S391 are identical to those of the previously described FIG. 7, and consequently will not be described again.

In this embodiment, the watermarking signal w is a binary signal, denoted {$w_i$}, each of its components representing a message bit. It is assumed, for the purpose of simplification, that there are as many components in the watermarking signal as there are coefficients $X_i$ representing the image to be modified (P coefficients chosen).

At step S395, the $i^{th}$ component of the signal w is extracted, that is to say with the same rank as the coefficient $X_i$ in the subset of coefficients to be modified.

At the following step S396, the integer part n, of the ratio between the coefficient $X_i$ and the masking value $A_i$ calculated at the previous step S391 is calculated.

The following step S397 is a test step in which it is determined whether one of the following two cases applies:

the current component $w_i$ is equal to zero and the value of $n_i$ obtained at the previous step is odd;

the current component $w_i$ is equal to 1 and the value of $n_i$ obtained at the previous step is even.

If one of the above two cases applies, then the value of $n_i$ is incremented at step S398, and the final step S399 is passed to.

In the negative, step S399 is passed to directly, in which the current coefficient $X_i$ is modified (without modulation) according to the following formula:

$$X^*_i = A_i \times n_i \qquad (6)$$

where $X^*_i$ designates the modified coefficient.

Thus, in the embodiment which has just been described, the watermarking signal is inserted by quantisation of a set of coefficients $X_i$, this quantisation being dependent on the calculated amplitude (the masking value) $A_i$ and the watermarking signal w.

Figure 9:
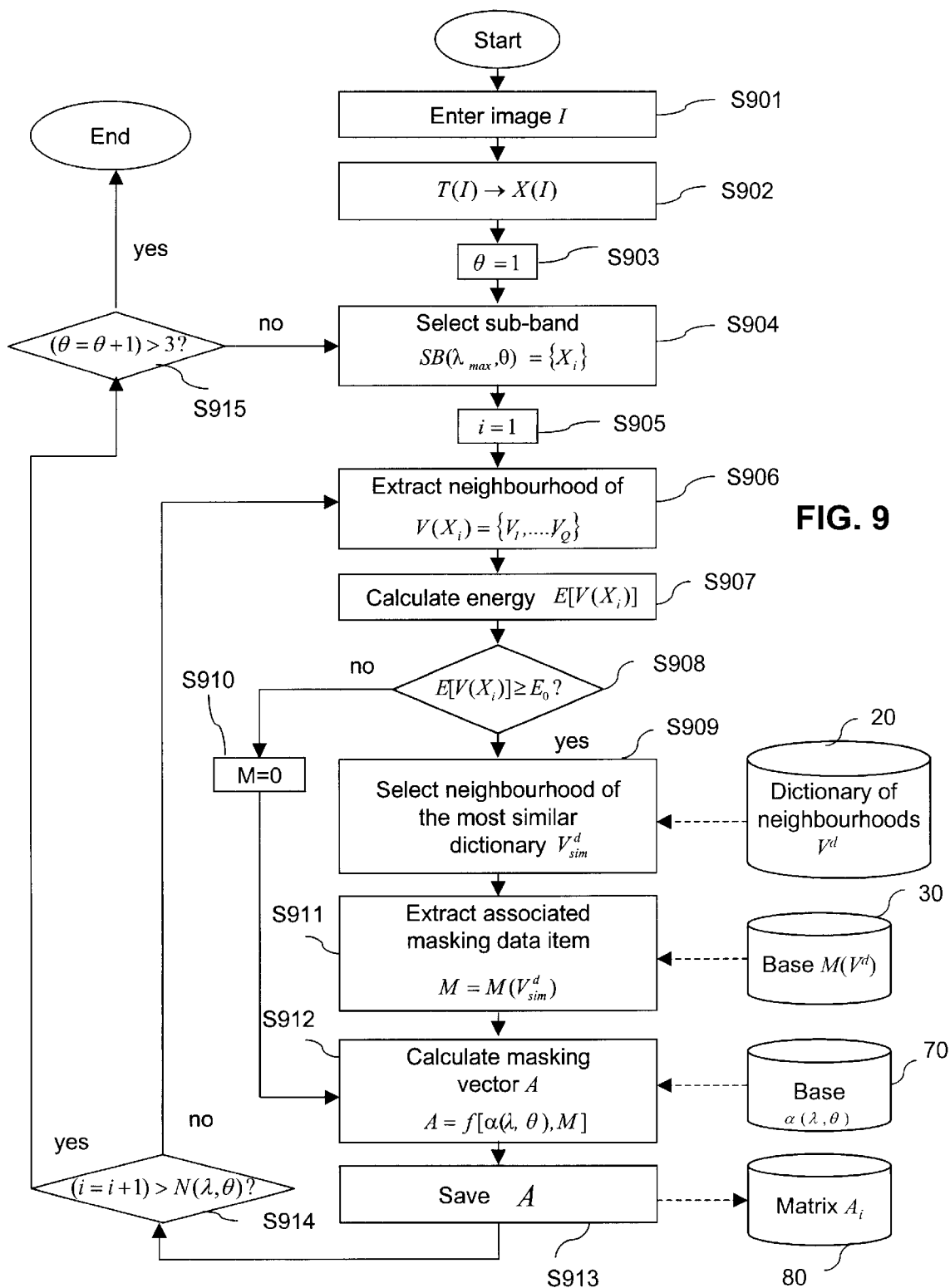
FIG. 9 depicts a flow diagram illustrating the calculation of a masking value for a set of coefficients representing an image, in accordance with another preferred embodiment of the invention.
Figure 10:
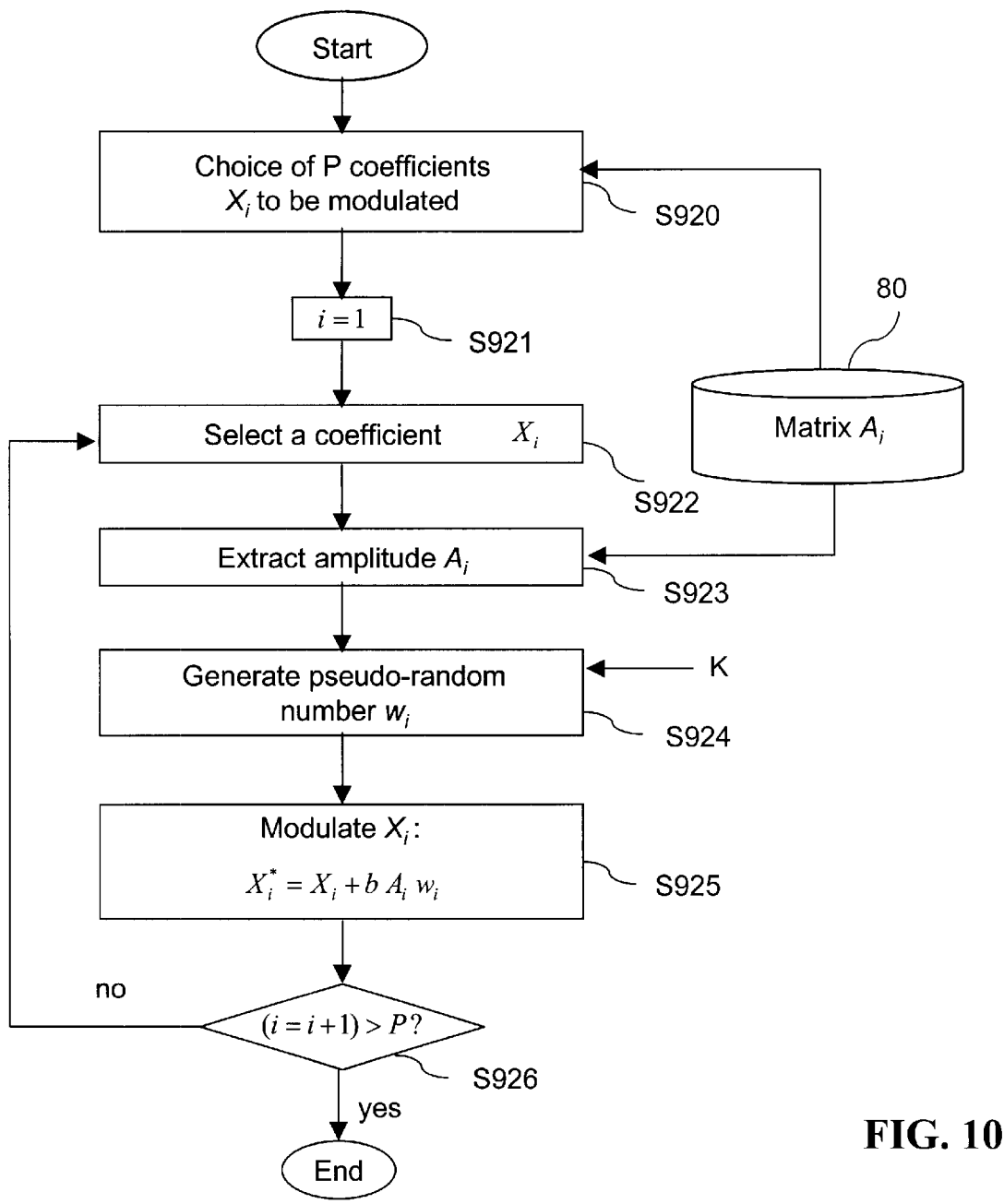
FIG. 10 depicts a flow diagram illustrating a method of inserting a masking signal in accordance with the embodiment illustrated in FIG. 9.

With reference now to FIGS. 9 and 10, a description will be given of another embodiment of the invention in which the first step (FIG. 9) is to calculate, for each coefficient $X_i$ amongst a chosen subset (for example one or more sub-bands) of coefficients representing the image to be watermarked, a masking vector A associated with the neighbourhood of the dictionary selected as being the most similar to the neighbourhood of the coefficient under consideration.

A matrix is obtained, referred to as the "masking matrix", each element $A_i$ of which is a masking value associated with a coefficient of a neighbourhood, in the image to be watermarked, of one of the coefficients $X_i$ of the subset chosen.

Thus all the coefficients of the image with the exception of the low-frequency sub-band $LL_3$ (since it is excluded from the neighbourhoods), have an associated masking value in the masking matrix.

Once the masking matrix has been obtained, a subset P of coefficients to be modified by modulation (FIG. 10) is chosen as in the embodiment illustrated in FIG. 7. Then an amplitude $A_i$ is extracted from the masking matrix, for each of the coefficients to be modulated, and then each of the coefficients is modulated using the watermarking signal and the amplitude extracted from the matrix.

With reference to FIG. 9 as a start, a description will be given of a method of calculating a masking value for a set of coefficients representing an image, in accordance with another preferred embodiment of the invention.

According to this method, the image to watermarked is first of all input (S901) and then transformed (S902) so as to obtain all the coefficients representing the image in the transformed domain.

Next a sub-band of maximum decomposition level ($\lambda_{max}$ = 3) is selected, commencing with the one of orientation 1 ($\theta$=1, step S903).

Next successively each of the coefficients $X_i$ contained in the selected sub-band SB is considered. At step S906 the neighbourhood of the current coefficient $X_i$ is determined: $V(X_i)$.

Steps S906 to S911 are similar respectively to steps S36, S701, S702, S703, S37, S38, of FIG. 7, and consequently reference will be made to the previous description of these steps in relation to FIG. 7.

At step S912, a masking vector is calculated, denoted "A", associated with the current neighbourhood $V(X_i)$. Each component of this vector corresponds to one of the coefficients contained in the current neighbourhood $V(X_i)$.

Each of the components of the masking vector is therefore a masking value $(A_i)$ which can be obtained in a similar fashion to the masking values obtained at step S391 of FIG. 7.

At the following step S913 the masking vector is saved by matching a masking value $(A_i)$ and the coefficient $(X_i)$ representing the image to which this value relates. This is accomplished through a matrix 80, referred to as the "masking matrix", containing all the masking values obtained. An index match makes it possible to establish a match between a masking value stored in the matrix and the coefficient representing the image to which it relates.

The previous operations (S905 to S913) are repeated for all the coefficients of a sub-band selected by means of the decision step S914.

Moreover, all these operations are recommenced for all the sub-bands with the maximum decomposition level starting from that with the orientation $\theta$=1 (S903), by means of the test step S915 associated with the selection step S904.

Thus masking values (stored in the matrix) will have been calculated for all the coefficients representing the image, with the exception of those corresponding to the low-frequency sub-band $LL_3$ (orientation $\theta$=0).

With reference now to FIG. 10, a description will be given of a method of inserting a masking signal using the masking matrix (80) obtained as described above in relation to FIG. 9.

In this example embodiment, a set of P coefficients representing the image will be modulated in order to insert a single information bit in the image.

First of all the P coefficients $X_i$ to be modulated are chosen (S921) and then each of the coefficients is selected (S922) successively commencing with the one with the index i equal to 1 (S121).

At step S923, the masking amplitude corresponding to the current coefficient is extracted from the masking matrix 80. At the following step E924, a pseudo-random number $w_i$ is generated. This is because the watermarking signal w is, here too, obtained by generating a pseudo-random sequence of numbers using a key (K).

At the following step S925, the current coefficient $X_i$ is modified by modulation, using the following formula:

$$X^*_i = X_i + bA_i w_i \qquad (7)$$

where $X^*_i$ designates the modulated coefficient; i is the index of the coefficient with $1 \leq i \leq P$; b is a number equal to 1 if the bit to be inserted is equal to 1, and is equal to $-1$ if the bit to be inserted is 0; finally $w_i$ is a pseudo-random number.

If it is wished to insert several information bits in the image, it is necessary to repeat this operation as many times as the number of bits which it is wished to insert.

In order to test the detectability of an information bit, a calculation of correlation $C(X^*, w)$ between the set of modulated coefficients $X^*$ and the watermarking signal w is generally carried out and it is decided whether there is actually watermarking of the image when the result of the correlation calculation $C(X^*, w)$ is greater than a predetermined threshold value Tc. In the affirmative, the value of the bit b is extracted according to the sign of the result.

It is also possible to use a standardised statistical test for detection such as the one described in the article entitled "*A method for signature casting on digital images*" by I. Pitas, in Proc. ICIP, pages 215–218, September 1996. Then the detection is characterised in terms of probability. It is thus possible to choose the threshold value Tc corresponding to a fixed detection probability level, for example 99.95%.

It is shown that the value of the statistical test depends on the variance of all the weighting amplitudes (in the present case: $A_i$), the variance of all the modulated coefficients and the chosen number P of coefficients.

Thus, knowing the masking amplitudes $A_i$ and the coefficients $X_j$, it is possible to theoretically determine the number of coefficients necessary for obtaining a detection probability level greater than a fixed threshold. It is in particular for this reason that, in the embodiment disclosed in relation to FIGS. 9 and 10, the first step is to calculate the amplitudes $A_i$ for all the coefficients of the image (except for the low-frequency sub-band).

In FIG. 10, the arrow shown between the matrix 80 and step S920 illustrates the use, according to the invention, of the masking amplitudes $A_i$ in the choice of the P coefficients to be modulated.

The present invention also concerns a device for inserting a watermarking signal w in a set of coefficients representing a digital image I.

This device for inserting a watermarking signal w comprises for example means for the spatio-frequency transformation of an image I, such as analysis filters associated with decimators by two adapted to effect a wavelet decomposition of an image I. It then also has means of inverse spatio-frequency recomposition for recomposing the image I after the insertion of the watermarking signal in the domain transformed into sub-bands.

It also has means of inserting a watermarking signal w of length P adapted to modify a subset of coefficients of cardinal P, in particular by modulating the coefficients according to the model described previously, in accordance with one embodiment of the invention.

This insertion device also has means of determining a neighbourhood of a representative coefficient to be modified. It also has means of selecting a neighbourhood in a dictionary of neighbourhoods representing coefficients representing the image to be watermarked, according to a predefined similarity criterion as described previously in the disclosure of the method of inserting a watermarking signal according to the present invention.

This device, according to a preferred embodiment of the invention, also has means of creating a dictionary of neighbourhoods representing the image to be watermarked, as well as means of generating, for each neighbourhood of the dictionary, a masking data item representing the masking effect of the neighbourhood on any watermarking signal.

In general terms, such a device includes all the means necessary for implementing the method of inserting a watermarking signal in a set of coefficients representing a digital image, in accordance with the present invention and described above with the help of FIG. 3.

In particular, this device includes all the means necessary for implementing one or more methods of implementing the insertion method according to the invention and described above in relation to FIGS. 4 to 10.

Such a device can be implemented in any system for processing information and in particular digital images, such as a digital camera, a digital printer, a digital photographic apparatus or a scanner.

Figure 11:
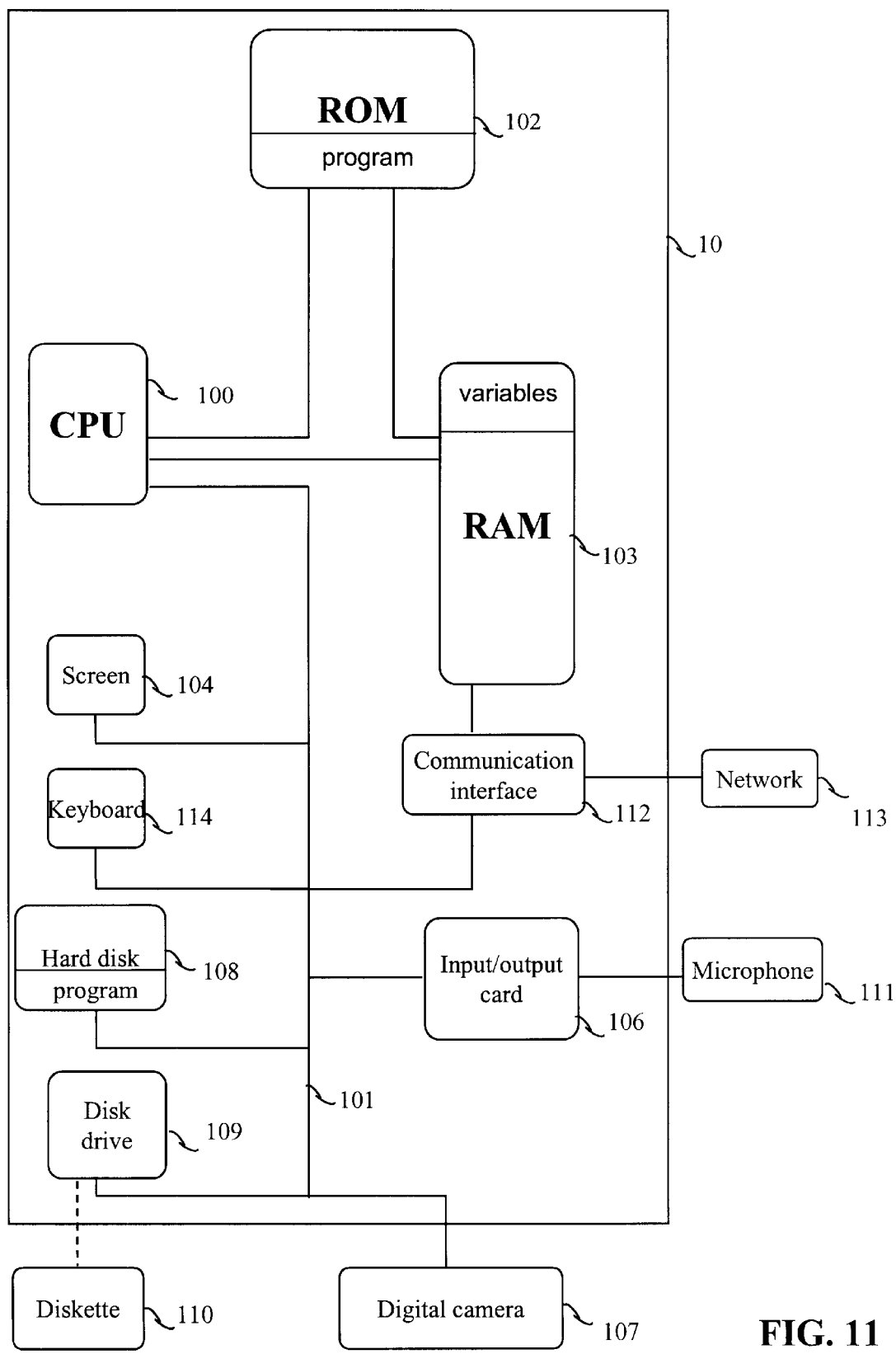
FIG. 11 depicts schematically a computer adapted to implement the method of inserting a watermarking signal in accordance with the present invention.

In particular, a watermarking signal insertion device in accordance with the invention can be used in a computer 10 as illustrated in FIG. 11.

In this embodiment, the method of inserting a watermarking signal in accordance with the invention is implemented in the form of a computer program associated with hardware and software elements necessary for its storage and execution. This computer program contains one or more sequences of instructions whose execution by the computer enables the steps of the watermarking signal insertion method according to the invention to be implemented.

In the computer depicted in FIG. 11, the means mentioned above of the device are incorporated notably in a microprocessor 100, a read only memory (ROM) 102 storing a program for inserting a watermarking signal w in an image I and a random access memory 103 containing registers adapted to store variables modified during the running of the program.

The microprocessor 100 is integrated into a computer 10 which can be connected to different peripherals, for example a digital camera 107 or a microphone 111, by means of an input/output card 106 in order to receive and store documents.

The digital camera 107 makes it possible notably to supply images to be authenticated by insertion of a watermarking signal.

This computer 10 has a communication interface 112 connected to a communication network 113 in order to receive any images to be watermarked.

The computer 10 also has document storage means, such as a hard disc 108, or is adapted to cooperate by means of a disc drive 109 with removable document storage means such as diskettes 110.

In addition, the hard disk can make it possible to store digital images, thus producing a database of learning images (50), useful for creating the dictionary of neighbourhoods.

These fixed or removable storage means can also include the code of the insertion method according to the invention which, once read by the microprocessor 100, will be stored on the hard disk 108.

By way of variant, the program enabling the insertion device to implement the invention can be stored in the read only memory (ROM) 102.

As a second variant, the program can be received in order to be stored as described previously by means of the communication network 113.

The computer 10 also has a display screen 104 for serving, for example, as an interface with an operator by means of a keyboard 114 or any other means.

The central processing unit (CPU) 100 will execute the instructions relating to the implementation of the invention. On powering up, the programs and methods relating to the invention stored in a non-volatile memory, for example the read only memory 102, are transferred into the random access memory 103 (RAM), which will then contain the executable code of the invention as well as the variables necessary for implementing the invention.

This random access memory 103 contains a set of registers for storing the variables necessary for running the program, and notably a register for storing the masking matrix (80) containing the masking amplitudes $A_i$, a register for storing the base (70) of weighting amplitudes $\alpha(\lambda,\theta)$, another for storing the spectral coefficients $X_i$, a register for storing the neighbourhoods $V(X_i)$ determined for the coefficients of the image chosen in order to be modified, a register for storing the dictionary of neighbourhoods (20), another for storing the masking data associated with the neighbourhoods of the dictionary (masking database 30), a register for storing all the coefficients of the image after modification.

A communication bus 101 allows communication between the different sub-elements of the computer 10 or linked to it. The representation of the bus 101 is not limitative and notably the microprocessor 100 is able to communicate instructions to any sub-element directly or by means of another sub-element.

Naturally, many modifications can be made to the example embodiments described above without departing from the scope of the invention.

It would thus be possible to use the transformed coefficients of the low-frequency sub-band LL, representing the local mean luminance of the image, in order to exploit the phenomenon of visual masking of the luminance. This would then result in a modification of the value of the weighting amplitudes ($\alpha_i$).

In addition, the insertion technique used can be applied to the raw digital image, without undergoing any spatio-frequency transformations prior to the modulation of the coefficients.

In this case, the modulated coefficients are coefficients representing the digital image solely in the spatial domain.

Moreover, the spatio-frequency transformation applied to the image can use analysis and synthesis filters other than those described previously, and be a transformation other than the discrete Fourier transformation by blocks or discrete cosine transformation by blocks. These transformations are normally used in conventional processings of digital images.

What is claimed is:

1. Method of inserting a watermarking signal (w) in a set (X) of coefficients ($X_i$) representing a digital image (I), in which at least one subset of coefficients is modified by said watermarking signal (w), said method comprising, for each representative coefficient ($X_i$) to be modified, the following steps:

determining a neighbourhood ($V(X_i)$) of said representative coefficient ($X_i$) to be modified, in the image (I);

selecting a neighbourhood ($V_{sim}^d$) in a dictionary of neighbourhoods representing coefficients representing said image (I), according to a predetermined criterion of similarity with said neighbourhood ($V(X_i)$) of said representative coefficient ($X_i$); and modifying said representative coefficient ($X_i$) as a function of the watermarking signal (w) and a predetermined masking data item ($M(V_{sim}^d)$) representing the masking effect on a watermarking signal of said neighbourhood ($V_{sim}^d$) selected from the dictionary.

2. Method of inserting a watermarking signal according to claim 1, comprising the following prior steps:

creating said dictionary of neighbourhoods ($V^d$) representing the coefficients representing said image (I);

generating, for each neighbourhood ($V^d$) in said dictionary, a masking data item ($M(V^d)$) representing the masking effect of the neighbourhood on a watermarking signal.

3. Method of inserting a watermarking signal according to claim 2, wherein said representative coefficients ($X_i$) are spatio-frequency coefficients obtained by a spatio-frequency transformation (T) of said image (I).

4. Method of inserting a watermarking signal according to claim 3, wherein the step of creating said dictionary comprises the following steps:

(A)—setting up a database of images, referred to as learning images, characteristic of a type of image to be watermarked;

(B)—for each learning image:

(b1)—selecting the coefficients representing the learning image under consideration, obtained by the transformation (T), belonging to at least one sub-band (SB) of the image under consideration; and, (b2)—for each coefficient ($X_i$) representing said sub-band (SB):

determining a neighbourhood ($V(X_i)$) of the representative coefficient ($X_i$) under consideration in the learning image under consideration;

calculating an energy ($E[V(X_i)]$) associated with the neighbourhood ($V(X_i)$) of the coefficient under consideration;

storing the neighbourhood ($V(X_i)$) in a database, referred to as the learning vector base, if the calculated energy ($E[V(X_i)]$) of the neighbourhood is greater than a predetermined threshold (E0);

(C) applying a predetermined processing to the vectors of the learning vector base so as to calculate a smaller number of vectors, the said calculated vectors constituting the dictionary of neighbourhoods.

5. Method of inserting a watermarking signal according to claim 4, wherein said dictionary of neighbourhoods is obtained by vector quantisation of the learning vector base.

6. Method of inserting a watermarking signal according to any one of claims 3 to 5, wherein the step of generating, for each neighbourhood ($V^d$) of said dictionary, a masking data item ($M(V^d)$) representing the masking effect of the neighbourhood on a watermarking signal, comprises the following steps, for each neighbourhood ($V^d$) of said dictionary:

applying the inverse of said transform ($T^{-1}$) to said neighbourhood ($V^d$) so as to obtain the corresponding image ($I_d$);

modifying all the coefficients ($V_i^d$) of said neighbourhood ($V^d$) in successive stages, applying a modification value (M) varying according to an incrementation pitch (p) at each stage, and at each modification stage:

applying the inverse transform ($T^{-1}$) to said modified neighbourhood ($V^{*d}$) so as to obtain the corresponding modified image ($I'_d$);

effecting a perceptual measurement ($MP(I_d, I^*_d)$) intended to evaluate a visual difference between the two images;

comparing the result of the perceptual measurement with a predetermined threshold (JND);

storing said modification value (M) when the result of the perceptual measurement reaches the predetermined threshold (JND), the modification value (M) stored constituting the masking data item ($M(V^d)$) associated with the neighbourhood ($V^d$) of the dictionary.

7. Method of inserting a watermarking signal according to claim 6, wherein the modification of each of the coefficients ($V_i^d$) of said neighbourhood ($V^d$) is carried out according to the following formula:

$$V^{*d}_i = V_i^d + M_i$$

in which $V^{*d}_i$ designates the modified coefficient and $M_i$ designates a modification value (M) estimated for the coefficient ($V_i^d$) under consideration.

8. Method of inserting a watermarking signal according to claim 7, wherein the modification of all the coefficients ($V_i^d$) of said neighbourhood ($V^d$) in successive stages is carried out according to the following formula:

$$V^{*d}_i = V_i^d + \alpha_i(1+M)$$

in which $V^{*d}_i$ designates the modified coefficient and $\alpha_i$ designates a weighting amplitude measured previously for said transformation (T) applied to a uniform image, independently of the image, as a function of psycho-visual criteria.

9. Method of inserting a watermarking signal according to any one of claims 1–5 wherein the step of modifying said representative coefficient ($X_i$) as a function of the watermarking signal (w) and a predetermined masking data item ($M(V_{sim}^d)$) representing the masking effect, is effected by modulation in accordance with the following formula:

$$X_i^* = X_i + A_i w_i$$

in which $X_i^*$ designates the modified representative coefficient $X_i$ and in which $A_i$ is a modulation amplitude calculated as a function of said masking data ($M(V_{sim}^d)$) representing the masking effect on a watermarking signal, of said neighbourhood ($V_{sim}^d$) selected in the dictionary.

10. Method of inserting a watermarking signal according to claim 9, wherein said modulation amplitudes $A_i$ are used in the choice of a subset of representative coefficients to be modulated.

11. Method of inserting a watermarking signal according to claim 2, wherein said masking data item ($M(V^d)$) generated for each neighbourhood ($V^d$) of said dictionary is calculated using a mathematical model.

12. Method of inserting a watermarking signal according to any one of claims 3 to 5, in which said transformation (T) is a discrete wavelet transformation (DWT), wherein a neighbourhood of any representative coefficient $X_i$ of said image is determined as being the oriented tree of wavelet coefficients which is in the neighbourhood of said representative coefficient $X_i$, the root of said tree consisting of the coefficient, referred to as the parent coefficient, which corresponds to the highest decomposition level in the tree.

13. Method of inserting a watermarking signal according to any one of claims 1–5, wherein the watermarking signal (w) is a predetermined pseudo-random sequence with a null mean.

14. Device for inserting a watermarking signal (w) in a set (X) of coefficients ($X_i$) representing a digital image (I), in which at least one subset of coefficients is modified by said watermarking signal (w), said device comprising, for each representative coefficient ($X_i$) to be modified:

means of determining a neighbourhood ($V(X_i)$) of said representative coefficient ($X_i$) to be modified, in the image (I);

means of selecting a neighbourhood ($V_{sim}^d$) in a dictionary of neighbourhoods representing coefficients representing said image (I), according to a predetermined criterion of similarity with said neighbourhood ($V(X_i)$) of the representative coefficient ($X_i$); and means of modifying said representative coefficient ($X_i$) as a function of the watermarking signal (w) and a predetermined masking data item ($M(V_{sim}^d)$) representing the masking effect on a watermarking signal, of said neighbourhood ($V_{sim}^d$) selected from the dictionary.

15. Device for inserting a watermarking signal according to claim 14, comprising:

means of creating said dictionary of neighbourhoods ($V^d$) representing the coefficients representing said image (I);

means of generating, for each neighbourhood ($V^d$) of said dictionary, a masking data item ($M(V^d)$) representing the effect of masking the neighbourhood on a watermarking signal.

16. Computer, comprising means adapted to implement a method of inserting a watermarking signal according to any one of claims 1–5, 14, or 15.

17. Computer, comprising a device for inserting a watermarking signal according to any one of claims 14 to 15.

18. Digital signal processing apparatus, comprising means adapted to implement an insertion method according to any one of claims 1–5, 14, or 15.

19. Digital image processing apparatus, comprising an insertion device according to any one of claims 14 to 15.

20. Digital printer, comprising means adapted to implement an insertion method according to any one of claims 1–5, 14, or 15.

21. Digital printer, comprising an insertion device according to any one of claims 14 to 15.

22. Digital photographic apparatus, comprising means adapted to implement an insertion method according to any one of claims 1–5, 14, or 15.

23. Digital photographic apparatus, comprising an insertion device according to any one of claims 14 to 15.

24. Digital camera, comprising means adapted to implement an insertion method according to any one of claims 1–5, 14, or 15.

25. Digital camera, comprising an insertion device according to any one of claims 14 to 15.

26. Scanner, comprising means adapted to implement an insertion method according to any one of claims 1–5, 14, or 15.

27. Scanner, comprising an insertion device according to any one of claims 14 to 15.

* * * * *

UNITED STATES PATENT AND TRADEMARK OFFICE
CERTIFICATE OF CORRECTION

PATENT NO. : 6,718,045 B2
DATED : April 6, 2004
INVENTOR(S) : Donescu et al.

It is certified that error appears in the above-identified patent and that said Letters Patent is hereby corrected as shown below:

Column 9,
Line 5, "coefficient Xj." should read -- coefficient Xi. --.

Column 14,
Line 35, "Cambridge" should read -- Cambridge, --; and
Line 55, "($M_1$, $M_2$, $M_3$)" should read -- ($M_1$, $M_2$, $M_3$). --.

Column 15,
Line 44, "Cambridge" should read -- Cambridge, --.

Column 21,
Line 2, "or" should be deleted; and
Line 49, "image (I);" should read -- image (I); and --.

Column 22,
Line 9, "consideration;" should read -- consideration; and --.
Line 14, "(EO);" should read -- (EO); and --;
Line 15, "(C)applying" should read -- (C)-applying --;
Line 30, "image (Id);" should read -- image (Id); and --; and
Line 42, "(JND);" should read -- (JND); and --.

Column 23,
Line 5, "claims 1-5" should read -- claims 1-5, --.

Column 24,
Line 13, "(I);" should read -- (I); and --.

Signed and Sealed this

Ninth Day of November, 2004

JON W. DUDAS
*Director of the United States Patent and Trademark Office*